US010095072B2

(12) United States Patent
Cheng et al.

(10) Patent No.: US 10,095,072 B2
(45) Date of Patent: Oct. 9, 2018

(54) LIQUID CRYSTAL DISPLAY PANEL AND LIQUID CRYSTAL ALIGNMENT METHOD THEREOF

(71) Applicant: AU Optronics Corp., Hsin-Chu (TW)

(72) Inventors: Wei-Cheng Cheng, Hsin-Chu (TW); Chen-Chun Lin, Hsin-Chu (TW); Yi-Chi Lee, Hsin-Chu (TW); Chao-Wei Yeh, Hsin-Chu (TW); Tien-Lun Ting, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 241 days.

(21) Appl. No.: 15/232,827

(22) Filed: Aug. 10, 2016

(65) Prior Publication Data
US 2017/0052414 A1 Feb. 23, 2017

(30) Foreign Application Priority Data

Aug. 21, 2015 (TW) ................................. 104127290

(51) Int. Cl.
*G02F 1/1337* (2006.01)
*G02F 1/1343* (2006.01)
(Continued)

(52) U.S. Cl.
CPC .. *G02F 1/134309* (2013.01); *G02F 1/133707* (2013.01); *G02F 1/133753* (2013.01);
(Continued)

(58) Field of Classification Search
CPC ............ G02F 1/133707; G02F 1/1393; G02F 1/134309; G02F 1/133345; G02F 1/133753; G02F 2001/13775
(Continued)

(56) References Cited

U.S. PATENT DOCUMENTS

2011/0069246 A1* 3/2011 Wang ................ G02F 1/133555
349/42
2013/0242239 A1 9/2013 Chang
(Continued)

FOREIGN PATENT DOCUMENTS

CN 103676351 A 3/2014
CN 103777404 5/2014
(Continued)

OTHER PUBLICATIONS

State Intellectual Property Office of the People's Republic of China, "Office Action", dated Nov. 1, 2017.

*Primary Examiner* — Nathanael R Briggs
*Assistant Examiner* — William Peterson
(74) *Attorney, Agent, or Firm* — WPAT, PC

(57) ABSTRACT

A liquid crystal display panel includes first substrate, active switching device, patterned insulating layer, pixel electrode, auxiliary electrode, second substrate, common electrode and liquid crystal molecules. The patterned insulating layer is disposed on the first substrate and includes a plurality of inner insulating branches and slits, and each slit is located between two adjacent inner insulating branches. The pixel electrode is disposed on the patterned insulating layer and electrically connected to the active switching device. The periphery of the pixel electrode overlaps the inner insulating branches. The auxiliary electrode is disposed on the first substrate and at least partially surrounding the pixel electrode. The auxiliary electrode and the pixel electrode are not electrically connected, and the inner insulating branches partially overlap the auxiliary electrode in a vertical projection direction. The common electrode is disposed on the second substrate. The liquid crystal molecules are interposed between the first and second substrates.

25 Claims, 34 Drawing Sheets

(51) Int. Cl.
  *G02F 1/1333* (2006.01)
  *G02F 1/137* (2006.01)
(52) U.S. Cl.
  CPC .............. *G02F 1/133345* (2013.01); *G02F 2001/13775* (2013.01)
(58) Field of Classification Search
  USPC ........................................................ 349/129
  See application file for complete search history.

(56) References Cited

U.S. PATENT DOCUMENTS

| | | | |
|---|---|---|---|
| 2014/0111753 A1* | 4/2014 | Kobayashi | G02F 1/133753 349/123 |
| 2015/0049288 A1 | 2/2015 | Yeh et al. | |
| 2015/0198836 A1 | 7/2015 | Nakamura | |
| 2016/0018705 A1 | 1/2016 | Cheng | |

FOREIGN PATENT DOCUMENTS

| | | |
|---|---|---|
| CN | 104267548 A | 1/2015 |
| JP | 200166601 | 3/2001 |
| TW | 201333609 | 8/2013 |
| TW | 201523104 | 6/2015 |

\* cited by examiner

LIQUID CRYSTAL DISPLAY PANEL AND LIQUID CRYSTAL ALIGNMENT METHOD THEREOF

BACKGROUND OF THE DISCLOSURE

1. Field of the Disclosure

The present disclosure relates to a liquid crystal display panel and a liquid crystal alignment method thereof, and more particularly, to a liquid crystal display panel which has a high transmittance and related liquid crystal alignment method.

2. Description of the Background

Since the liquid crystal display panel has advantages of less volume and weight, and energy-efficiency, it is used extensively in every kind of electronic product, such as smart phones, notebook computers, tablet PCs and soon. Because of the effect of wide viewing angles, the polymer-stabilized alignment (PSA) liquid crystal display panel is fabricated to be a high contrast and wide viewing angles display, such as a TV, a monitor, a notebook computer, and a public information display. The fabrication process of the PSA liquid crystal display panels is blending a few photo-curing alignment monomers in the liquid crystal molecules, providing voltages to generate a pretilt angle of the liquid crystal molecules, and using ultraviolet (UV) light adequately to expose the photo-curing alignment monomers and make the photo-curing alignment monomers polymerize. Making a comparison with the multi-domain vertical alignment (MVA) liquid crystal display panel, the MVA liquid crystal display panel further requires an alignment structure like a protrusion to assist alignment, and the PSA liquid crystal display panel can improve the dark-state light leakage. Because of the higher contrast and wider viewing angles, each pixel of a liquid crystal display panel is divided into a plurality of alignment regions, and the pixel electrode only comprises a plurality of branched pixel electrodes extending along different directions make the liquid crystal molecules in different alignment regions lie down towards different directions when the pixel electrodes are provided the voltages. However, because the liquid crystal is a continuum, the intersections of branched pixel electrodes extending along different directions have many areas in which the arrangement of the liquid crystal molecules is discontinuous and make the efficiency of the liquid crystal decrease. The observation in microscopic is dark lines would appear in the pixel, and the observation in macroscopic is the quality decreasing caused by the transmittance decreasing.

The description in the above is only for understanding of the background of the present disclosure. Therefore, it may include some parts that do not belong to any part of related conventional technology and do not give any inspiration to those skilled in the art.

SUMMARY OF THE DISCLOSURE

In one aspect, the present disclosure relates to a liquid crystal display panel and a liquid crystal alignment method thereof including using a specific design of patterned insulating layer and providing the voltage in the process of liquid crystal alignment such that the arrangement order of the liquid crystal molecules can be improved, the appearance of dark lines can be decreased, and the transmittance may be increased.

In one of the embodiments, the liquid crystal display panel that includes a first substrate, a data line, a gate line, a patterned insulating layer, an auxiliary electrode, a second substrate, and a plurality of liquid crystal molecules. The data line and the gate line are disposed on the first substrate. The active switching device is disposed on the first substrate and is electrically connected to the data line and the gate line. The patterned insulating layer is disposed on the first substrate, wherein the patterned insulating layer includes a plurality of inner insulating branches and a plurality of slits, and each of the slits is located between two adjacent inner insulating branches. The pixel electrode is disposed on the patterned insulating layer and is electrically connected to the active switching device, wherein a periphery of the pixel electrode overlaps the inner insulating branches. The auxiliary electrode is disposed on the first substrate and at least partially surrounds the pixel electrode, wherein the auxiliary electrode and the pixel electrode are not electrically connected, and the auxiliary electrode partially overlaps the inner insulating branches in a vertical projection direction. The second substrate is disposed to face the first substrate. The common electrode is disposed on the second substrate. The liquid crystal molecules are interposed between the first substrate and the second substrate.

In another one of the embodiments of the present disclosure provides a liquid crystal alignment method including the following steps. The liquid crystal display panel mentioned above is provided. The liquid crystal molecules are mixed with a plurality of light-curing alignment monomers. A first voltage is applied to the common electrode and a second voltage is applied to the pixel electrode, and a third voltage is applied to the auxiliary electrode, so that a pretilt angle of the liquid crystal molecules is formed. The light-curing alignment monomers are light irradiated under the first voltage, the second voltage and the third voltage, such that the light-curing alignment monomers are polymerized to form a first alignment film and a second alignment film on the first substrate and the second substrate respectively, and fix the pre-tilt angle of the liquid crystal molecules. The difference of the root mean square of the third voltage and the root mean square of the first voltage is greater than the difference of the root mean square of the second voltage and the root mean square of the first voltage.

In order to make the aforementioned features and advantages of the present disclosure comprehensible, embodiments accompanied with figures are described in detail below.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE DISCLOSURE

Figure 1:
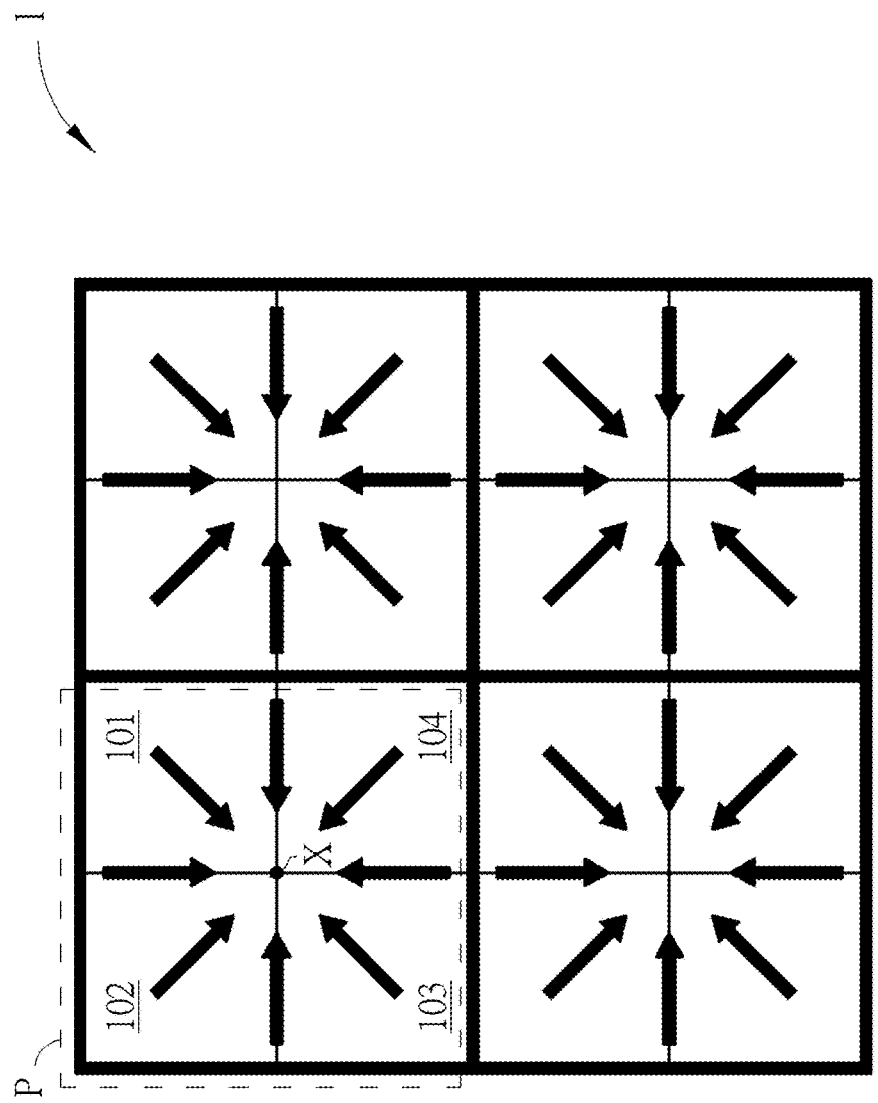
FIG. 1 is a schematic diagram illustrating the direction which the liquid crystal molecules of liquid crystal display panel lie down towards according to the comparison embodiment of the present disclosure.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-34. In accordance with the purposes of this invention, as embodied and broadly described herein, this invention, in one aspect, relates to a liquid crystal display panel, and in other aspect, relates to a liquid crystal alignment method.

Figure 2:
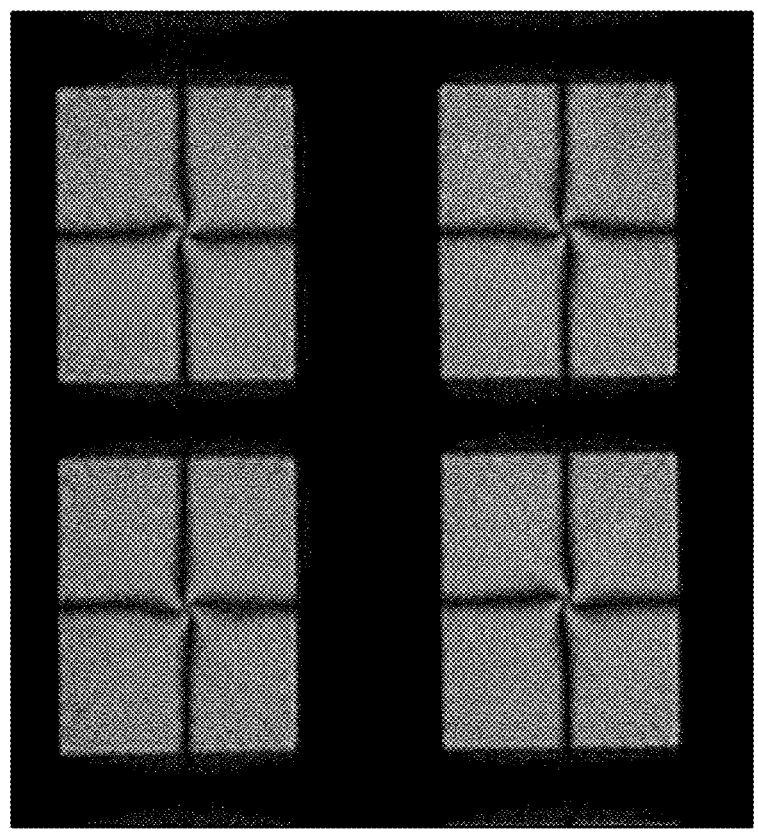
FIG. 2 is an optical microscope picture of the comparison embodiment of the present disclosure.

Referring to FIG. 1 and FIG. 2, FIG. 1 is a schematic diagram illustrating the direction which the liquid crystal molecules of liquid crystal display panel lie down towards according to the comparison embodiment of the present disclosure, and FIG. 2 is an optical microscope picture of the comparison embodiment of the present disclosure. As shown in FIG. 1, the liquid crystal display panel 1 of the comparison embodiment includes a plurality of pixels P, wherein each pixel P includes a plurality of alignment regions, for example a first alignment region 101, a second alignment region 102, a third alignment region 103 and a fourth alignment region 104. In the comparison embodiment, the liquid crystal molecules of the first alignment region 101, the second alignment region 102, the third alignment region 103 and the fourth alignment region 104 lie down towards different directions which are respectively towards the centers X of the boundaries of all the alignment region when they are driven, as shown by the arrows in FIG. 1. When the liquid crystal molecules lie down towards the centers X, the liquid crystal molecules positioned around the boundary between adjacent alignment regions have an incongruous arrangement caused by disturbing each other, resulted in that the center dark line is thick and the transmittance of the liquid crystal display panel 1 is decreased. As shown in FIG. 2, the dark lines at the centers of boundaries between adjacent alignment regions and within the adjacent alignment regions of the liquid crystal display panel 1 of the comparison embodiment are both evident, and the transmittance and the display effect are influenced strongly.

Figure 3:
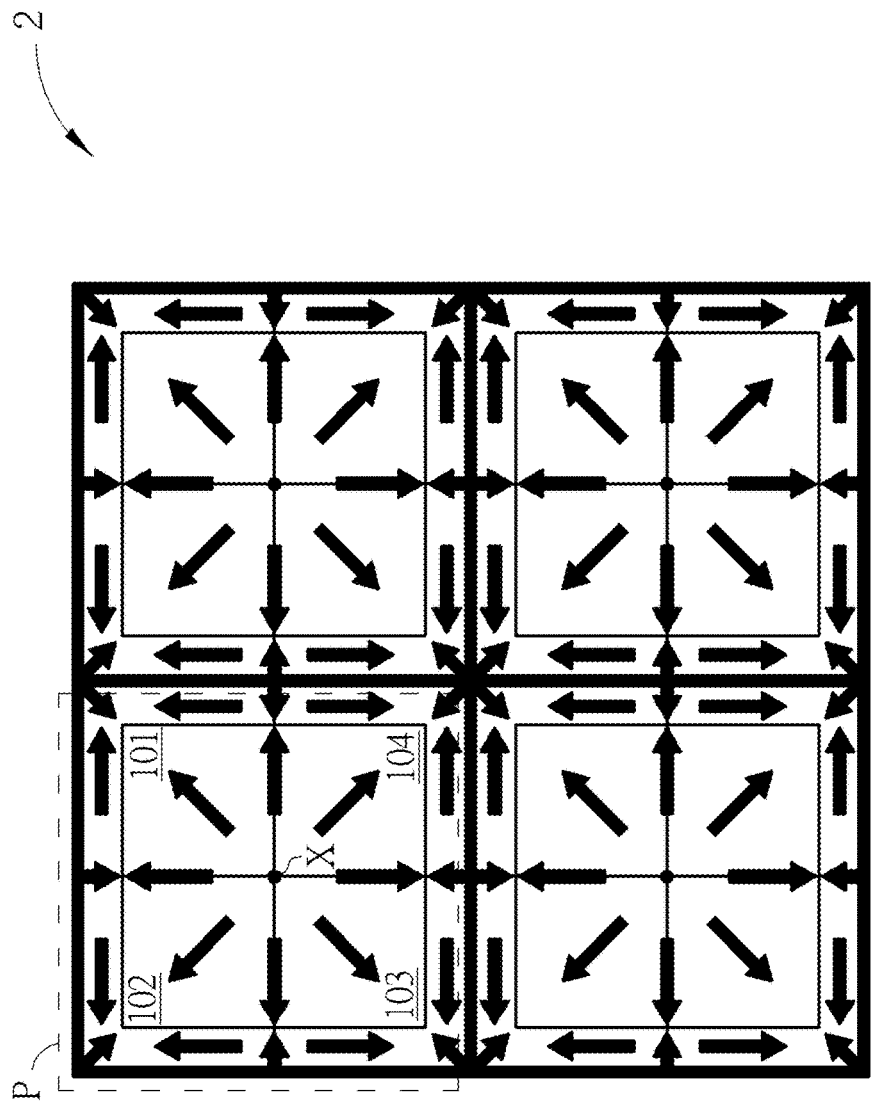
FIG. 3 is a schematic diagram illustrating the direction which the liquid crystal molecules of liquid crystal display panel lie down towards according to an embodiment of the present disclosure.
Figure 4:
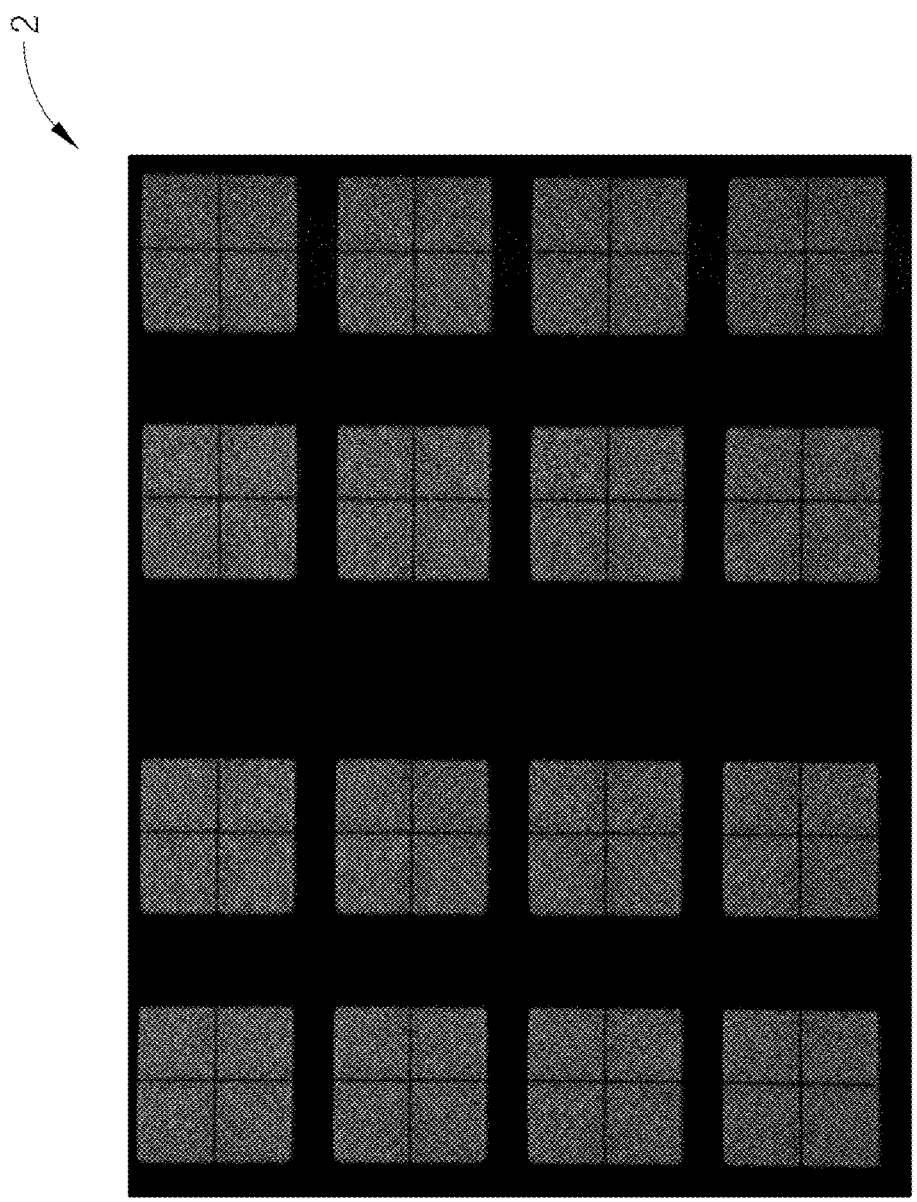
FIG. 4 is an optical microscope picture of the embodiment of the present disclosure.
Figure 5:
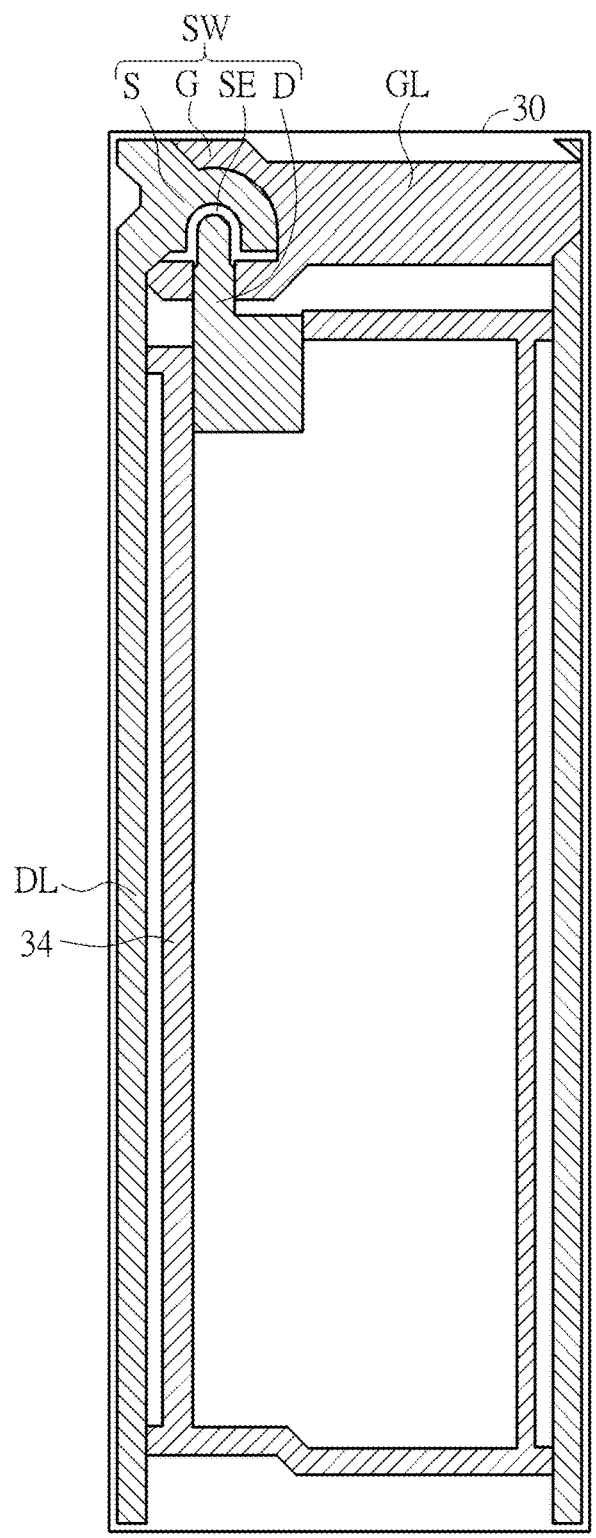
FIG. 5 is a top view of a gate line, a data line, an active switching device and an auxiliary electrode of a liquid crystal display panel according to a first embodiment of the present disclosure.

Referring to FIG. 3 and FIG. 4, FIG. 3 is a schematic diagram illustrating the direction which the liquid crystal molecules of liquid crystal display panel lie down towards according to an embodiment of the present disclosure, and FIG. 4 is an optical microscope picture of the embodiment of the present disclosure. As shown in FIG. 3, in the liquid crystal display panel 2 of the embodiment of the present disclosure, the liquid crystal molecules of the first alignment region 101, the second alignment region 102, the third alignment region 103 and the fourth alignment region 104 lie down outwards and opposite to the centers X of the alignment regions when they are driven, as shown by the arrows in FIG. 3. Therefore, the liquid crystal molecules have a consistent and regular arrangement and do not disturb each other. As shown in FIG. 4, different from the comparison embodiment, the dark lines at the center of boundaries between the adjacent alignment regions and within the adjacent alignment regions of the liquid crystal display panel 2 of the present embodiment are thinner and not obvious. Thus, the transmittance and the display effect are elevated.

All kinds of embodiments of the present disclosure having the technical feature which the liquid crystal molecules lie down outwards and opposite to the center are set out below.

Figure 6:
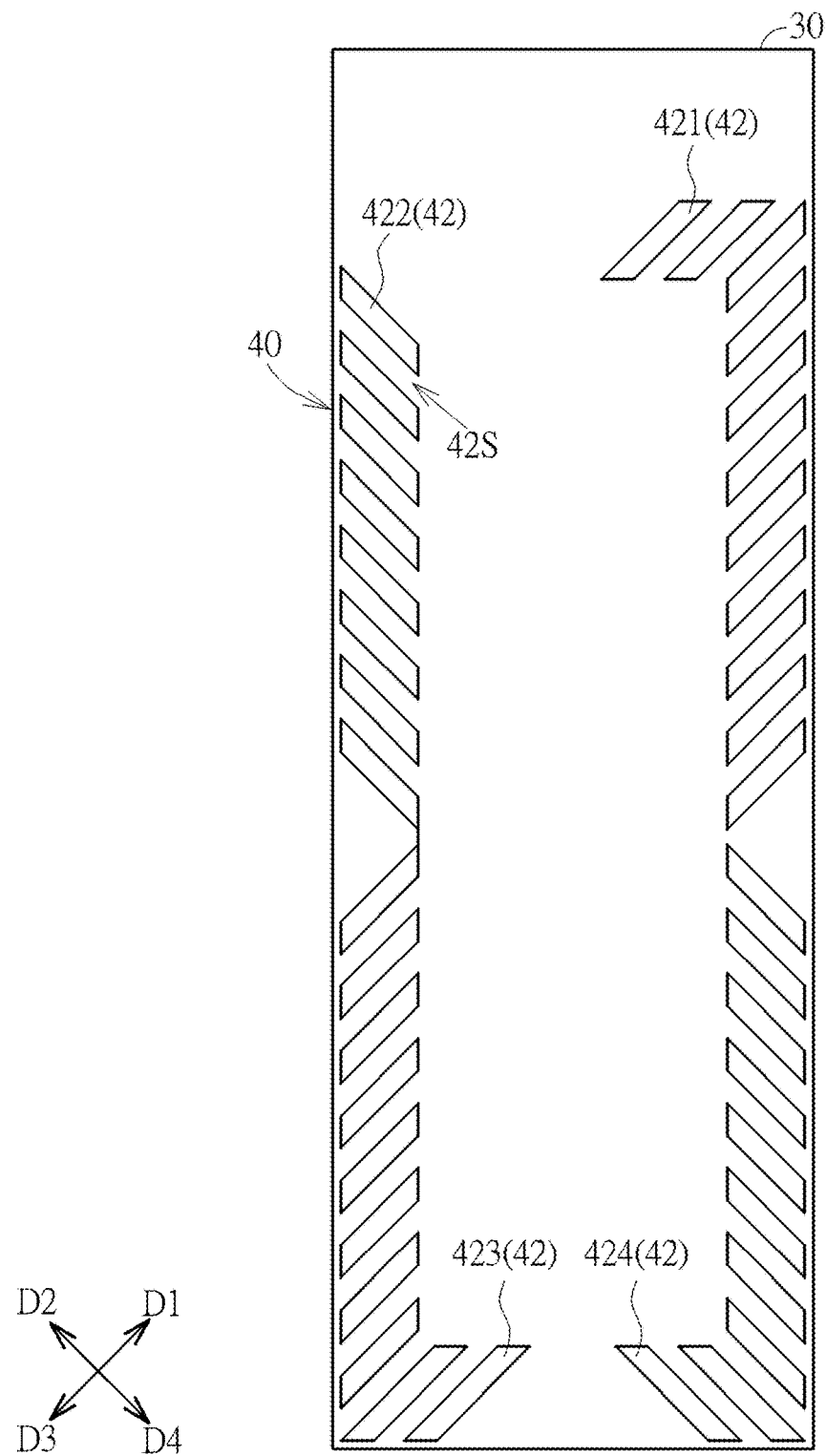
FIG. 6 is a top view of a patterned insulating layer of the liquid crystal display panel according to the first embodiment of the present disclosure.
Figure 7:
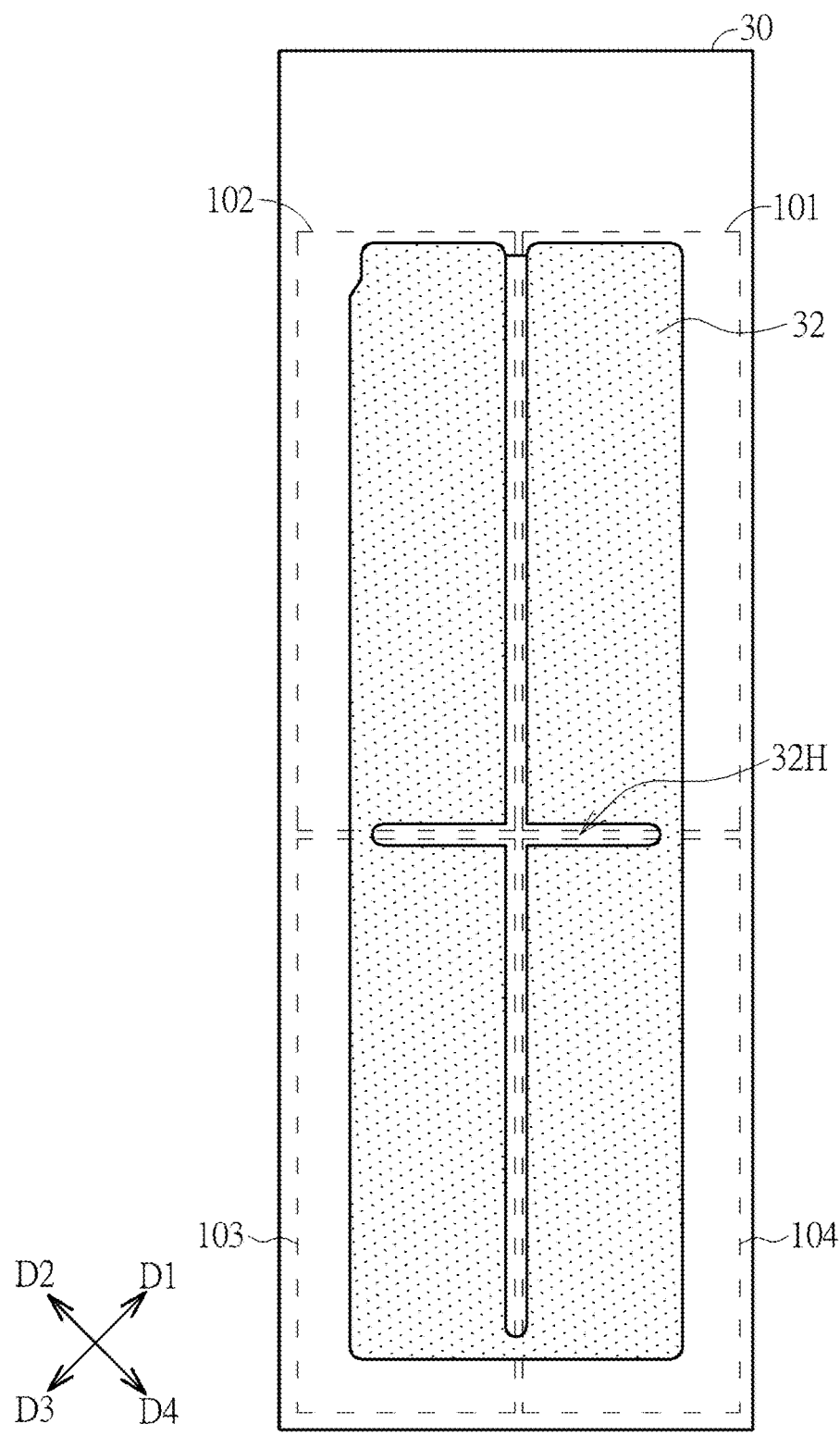
FIG. 7 is a top view of a pixel electrode of the liquid crystal display panel according to the first embodiment of the present disclosure.
Figure 8:
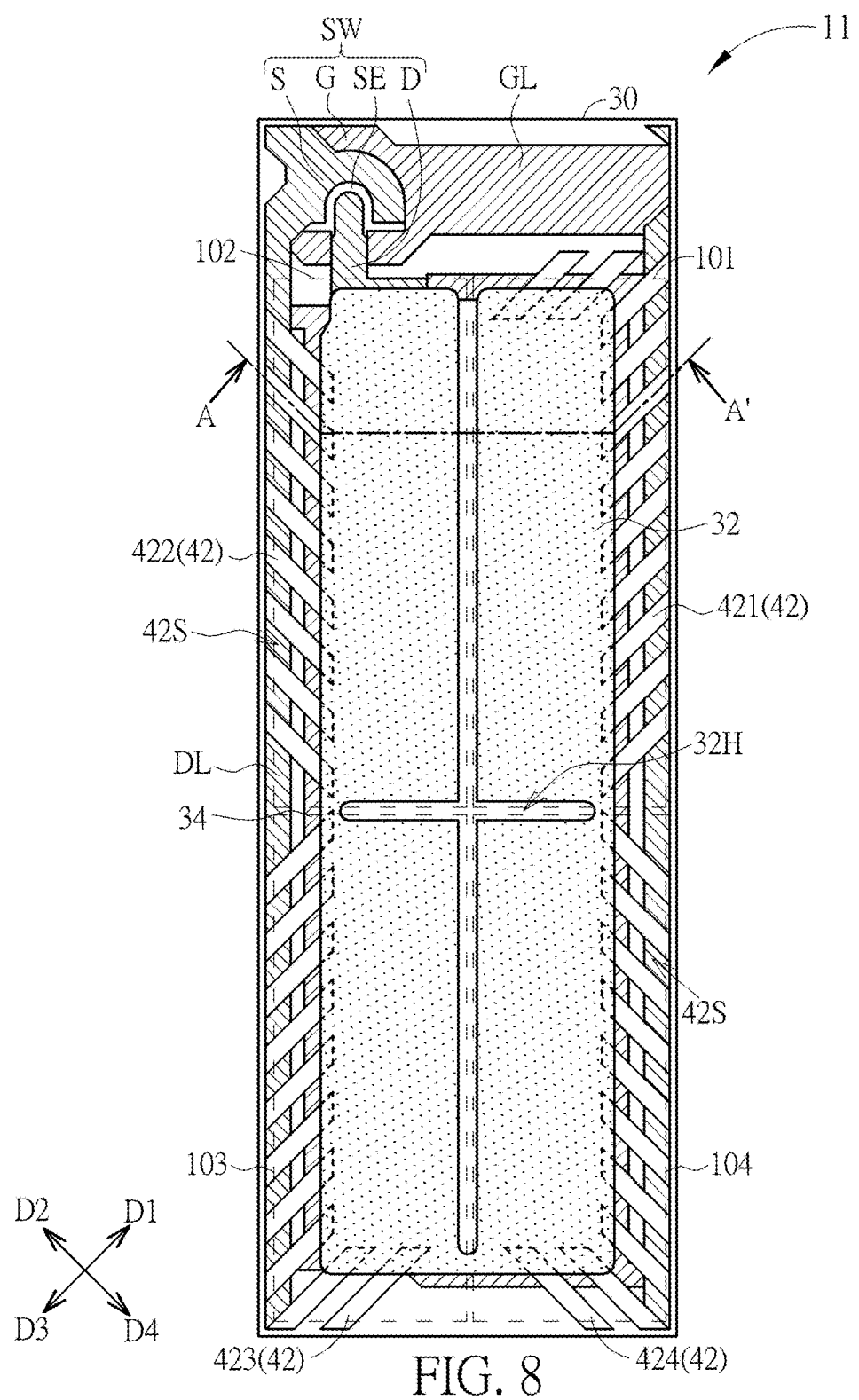
FIG. 8 is a top view of the liquid crystal display panel according to the first embodiment of the present disclosure.
Figure 9:
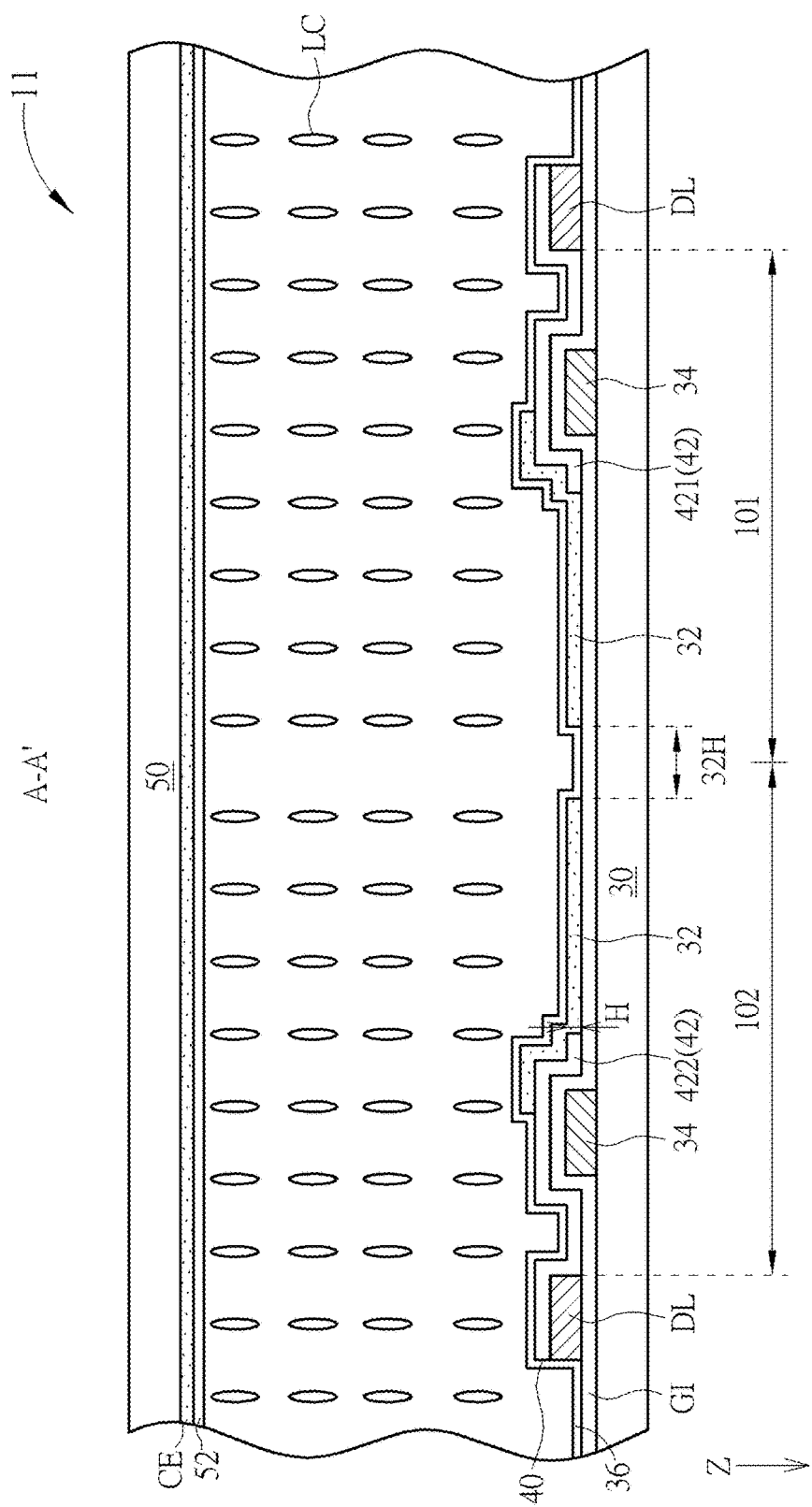
FIG. 9 is a cross-sectional view taken along line A-A' of the liquid crystal display panel in FIG. 8.

Referring to FIG. 5 to FIG. 9, FIG. 5 is a top view of a gate line, a data line, an active switching device and an auxiliary electrode of a liquid crystal display panel according to a first embodiment of the present disclosure. FIG. 6 is a top view of a patterned insulating layer of the liquid crystal display panel according to the first embodiment of the present disclosure. FIG. 7 is a top view of a pixel electrode of the liquid crystal display panel according to the first embodiment of the present disclosure. FIG. 8 is a top view of the liquid crystal display panel according to the first embodiment of the present disclosure and FIG. 9 is a cross-sectional view taken along line A-A' of the liquid crystal display panel in FIG. 8. For highlighting the features of the present disclosure, the schematic diagrams only illustrate a single pixel unit. As shown in FIG. 5 to FIG. 9, the liquid crystal display panel 11 of the present embodiment includes a first substrate 30, a data line DL, a gate line GL, an active switching device SW, an insulating patterned layer 40, a pixel electrode 32, an auxiliary electrode 34, a second substrate 50, a common electrode CE and liquid crystal molecules LC. The first substrate 30 may be a transparent substrate such as a glass substrate, a plastic substrate, a quartz substrate, a sapphire substrate, or other suitable rigid substrates, or flexible substrates. The data line DL, the gate line GL, and the active switching device SW are disposed on the first substrate 30, wherein the active switching device SW is electrically connected to the data line DL and the gate line GL. In the present embodiment, the active switching device SW uses a bottom gate thin film transistor including a gate G, a semiconductor channel layer (or namely semiconductor layer) SE, a source S and a drain D, wherein the gate line GL and the gate G may belong to a same patterned conductive layer (for example the first metal layer) and electrically connected to each other. The data line DL, the source S and the drain D may belong to a same patterned conductive layer (for example the second metal layer), and the data line DL and the source S are electrically connected to each other. In addition, an insulating layer GI may be disposed between the gate G and the semiconductor channel layer SE. In a variation of the embodiment, the active switch device SW may use a top gate thin film transistor, or other thin film transistors.

As shown in FIG. 6, the patterned insulating layer 40 is disposed on the first substrate 30, wherein the patterned insulating layer 40 includes a plurality of inner insulating branches 42 and a plurality of slits 42S, and each of the slits is located between two adjacent inner insulating branches. In the present embodiment, the depth H of the slits 42S (approximately the thickness of the patterned insulating layer 40) may be greater than or equal to 0.2 micrometers (μm) and less than or equal to 1 micrometer, such that the liquid crystal display panel 11 may have a better transmittance. The inner insulating branches 42 may extend in different directions. For instance, the inner insulating branches 42 of the present embodiment of may include a plurality of first inner insulating branches 421 extending along a first direction D1, a plurality of second inner insulating branches 422 extending along a second direction D2, a plurality of third inner insulating branches 423 extending along a third direction D3, and a plurality of fourth inner insulating branches 424 extending along a fourth direction D4, wherein the first direction D1, the second direction D2, the third direction D3 and the fourth direction D4, are respectively different directions extending outwardly from a center point X of the alignment regions. The first inner insulating branches 421, the second inner insulating branches 422, the third inner insulating branches 423 and the fourth inner insulating branches 424 are respectively located at the outer side of the first alignment region 101, the second alignment region 102, the third alignment region 103 and the fourth alignment region 104. For example, if the extending direction of the gate line GL is set as a reference and the counterclockwise direction is regarded as the positive direction, the angles between the gate line GL and the first direction D1, the gate line GL and the second direction D2, the gate line GL and the third direction D3, and the gate line GL and the fourth direction D4 are substantially 45 degrees, 135 degrees, 225 degrees and 315 degrees respectively, but not limited thereto. In an alternative embodiment, the inner insulating branches may extend along two directions, three directions or more directions. Generally, the angle between the first direction D1 and the gate line GL may be any angle between 0 degrees to 90 degrees. Further, when the first inner insulating branches 421 extend along more than one first direction D1, a plurality of different angles may be formed between each of the first directions D1 and the gate line GL. For instance, the above-described angles may respectively be selected from 45 degrees, 50 degrees, 60 degrees, 70 degrees, 80 degrees, 40 degrees, 30 degrees, 20 degrees, or 10 degrees, but not limited thereto. The angle between the second direction D2 and the gate line GL may be any angle between 90 degrees to 180 degrees. In addition, when the second inner insulating branches 422 extend along more than one second direction D2, a plurality of different angles may be formed between each of the second directions D2 and the gate line GL. For example, the above-described angles may respectively be selected from substantially 135 degrees, 140 degrees, 150 degrees, 160 degrees, 170 degrees, 130 degrees, 120 degrees, 110 degrees, or 100 degrees, but not limited thereto. The angle between the third direction D3 and the gate line GL may be any angle between 180 degrees to 270 degrees. Moreover, when the third inner insulating branches 423 extend along more than one third direction D3, a plurality of different angles may be formed between each of the third directions D3 and the gate line GL. For example, the above-described angles may respectively be selected from substantially 225 degrees, 230 degrees, 240 degrees, 250 degrees, 260 degrees, 220 degrees, 210 degrees, 200 degrees, or 190 degrees. The angle between the fourth direction D4 and the gate line GL may be any angle between 270 degrees to 360 degrees. Furthermore, when the fourth inner insulating branches 424 extend along more than one fourth direction D4, a plurality of different angles may be formed between each of the fourth directions D4 and the gate line GL. For example, the above-described angles may respectively be selected from substantially 270 degrees, 315 degrees, 325 degrees, 335 degrees, 340 degrees, 350 degrees, 310 degrees, 300 degrees, 290 degrees, or 280 degrees, but not limited thereto. In the present embodiment, the first inner insulating branches 421, the second inner insulating branches 422, the third inner insulating branches 423 and the fourth inner insulating branches 424 are only disposed at the outer side of the first alignment region 101, the second alignment region 102, the third alignment region 103 and the fourth alignment region 104. In other words, the first inner insulating branches 421, the second inner insulating branches 422, the third inner insulating branches 423 and the fourth inner insulating branches 424 are only disposed at the periphery of the below region corresponding to the location of the pixel electrode 32, but not limited thereto.

The pixel electrode 32 is disposed on the patterned insulating layer 40 and is electrically connected to the drain D of the active switching device SW. The periphery of the pixel electrode 32 overlaps at least partially of each the inner insulating branches 42. In the present embodiment, as shown in FIG. 7, the pixel electrode 32 is disposed in the first alignment region 101, the second alignment region 102, the third alignment region 103 and the fourth alignment region 104, and pixel electrode 32 has a cross-shaped opening 32H. The cross-shaped opening 32H is substantially located at the boundaries of the first alignment region 101, the second alignment region 102, the third alignment region 103 and the fourth alignment region 104. In addition, the pixel electrode 32 disposed in the first alignment region 101, the second alignment region 102, the third alignment region 103 and the fourth alignment region 104 is a full-surfaced electrode. In other words, the pixel electrode 32 has no slits except for the cross-shaped opening 32H. Thus, lens mura formed by the error of the positioning process during manufacturing the slits might not be generated. In a variant embodiment, the pixel electrode 32 may also have the slits. Referring to FIG. 8 and FIG. 9, the auxiliary electrode 34 is disposed on the first substrate 30 and at least partially surrounds the pixel electrode 32 and formed a hollow that overlaps the pixel electrode 32 in the vertical projection direction Z, wherein the auxiliary electrode 34 and the pixel electrodes 32 are not connected to each other, i.e., the auxiliary electrode 34 and the pixel electrode 32 is not electrically connected to each other structurally and electrically, and the inner insulating branches 42 partially overlaps the auxiliary electrode 34 in the vertical projection direction Z. In the present embodiment, the inner insulating branches 42 protrude from the outer side of the auxiliary electrode 34, but not limited thereto. In addition, the auxiliary electrode 34 is disposed under the patterned insulating layer 40. In other words, the inner insulating branches 42 step onto the auxiliary electrode 34 and the ups and downs structure is formed. Furthermore, the pixel electrode 32 is disposed on the patterned insulating layer 40, and the auxiliary electrode 34 partially overlaps the pixel electrode 32 in the vertical projection direction. Therefore, the pixel electrode 32 above the auxiliary electrode 34 and the inner insulating branches 42 may have a bump structure due to the auxiliary electrode 34. In the manufacturing process, the auxiliary electrode 34 and the gate line GL may belong to a same patterned conductive layer, but not limited thereto. The auxiliary electrode 34 and the data line DL may belong to a same patterned conductive layer, and the auxiliary electrode 34 may include non-transparent conductive materials such as metals, alloys or transparent conductive materials such as metal oxides, or other suitable conductive materials.

As shown in FIG. 9, the second substrate 50 is disposed to face the first substrate 30. The common electrode CE is disposed on the second substrate 50. The liquid crystal molecules LC are interposed between the first substrate 30 and the second substrate 50. The liquid crystal display panel 1 of the present embodiment may further include alignment layers 36, 52, wherein the alignment layer 36 may be disposed on the first substrate 30 and the pixel electrode 32, and the alignment layer 52 may be disposed on the second substrate 30 and the common electrode CE. The alignment layers 36, 52 may be polymer materials having the side chains, and a dielectric constant of the alignment layers 36, 52 may be greater than a perpendicular dielectric constant of the liquid crystal molecules LC. For example, the material of the alignment layers 36, 52 may include polyimide, but not limited thereto. In addition, the liquid crystal display panel 11 may further include a color filter layer (not shown in figure), a light-shielding pattern, for example a black matrix (not shown in figure), or other display devices, and thus will not be redundantly described.

Figure 10:
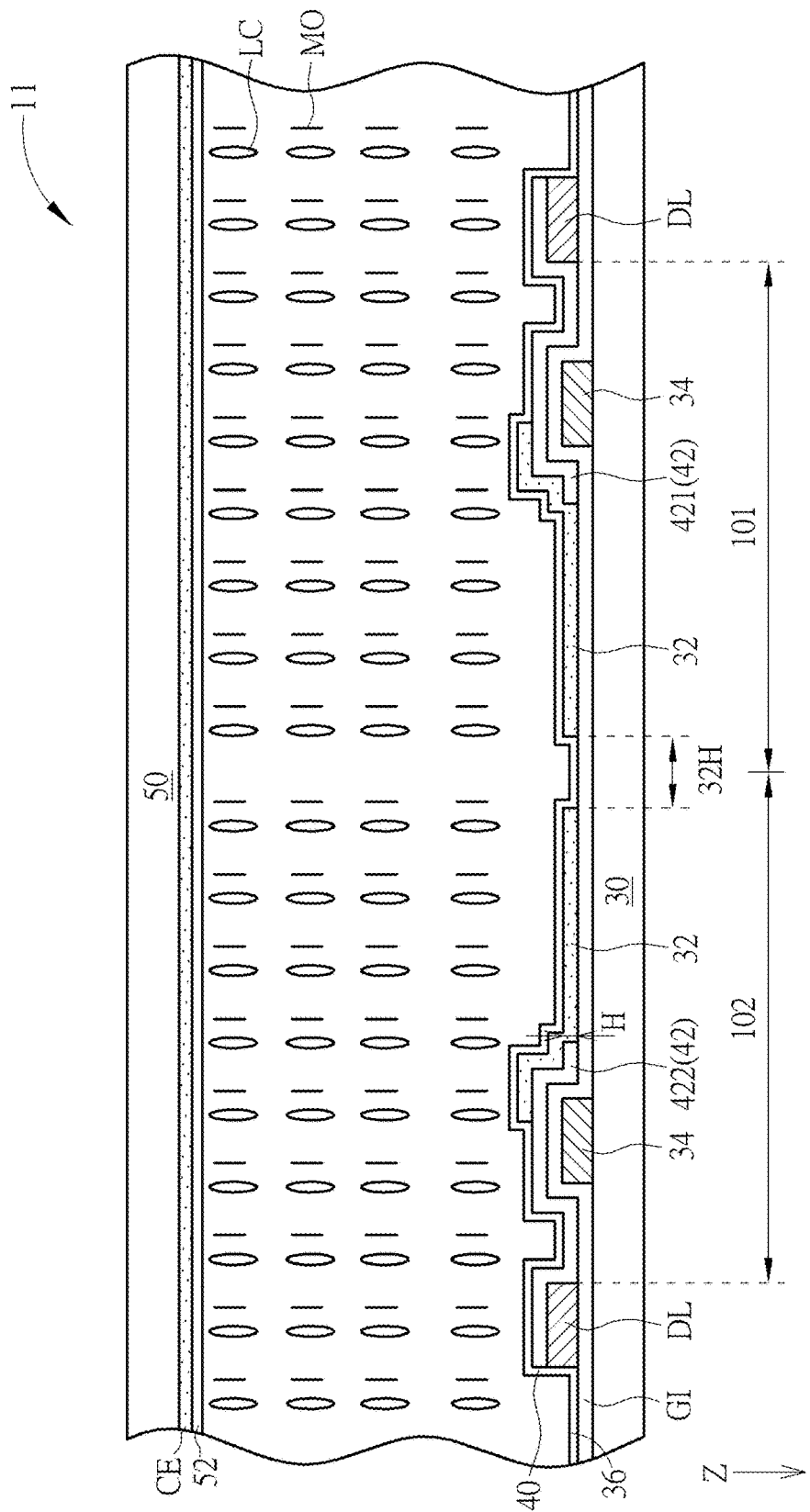
FIG. 10 to FIG. 12 are schematic diagrams illustrating a liquid crystal alignment method of the liquid crystal display panel according to an embodiment of the present disclosure.
Figure 11:
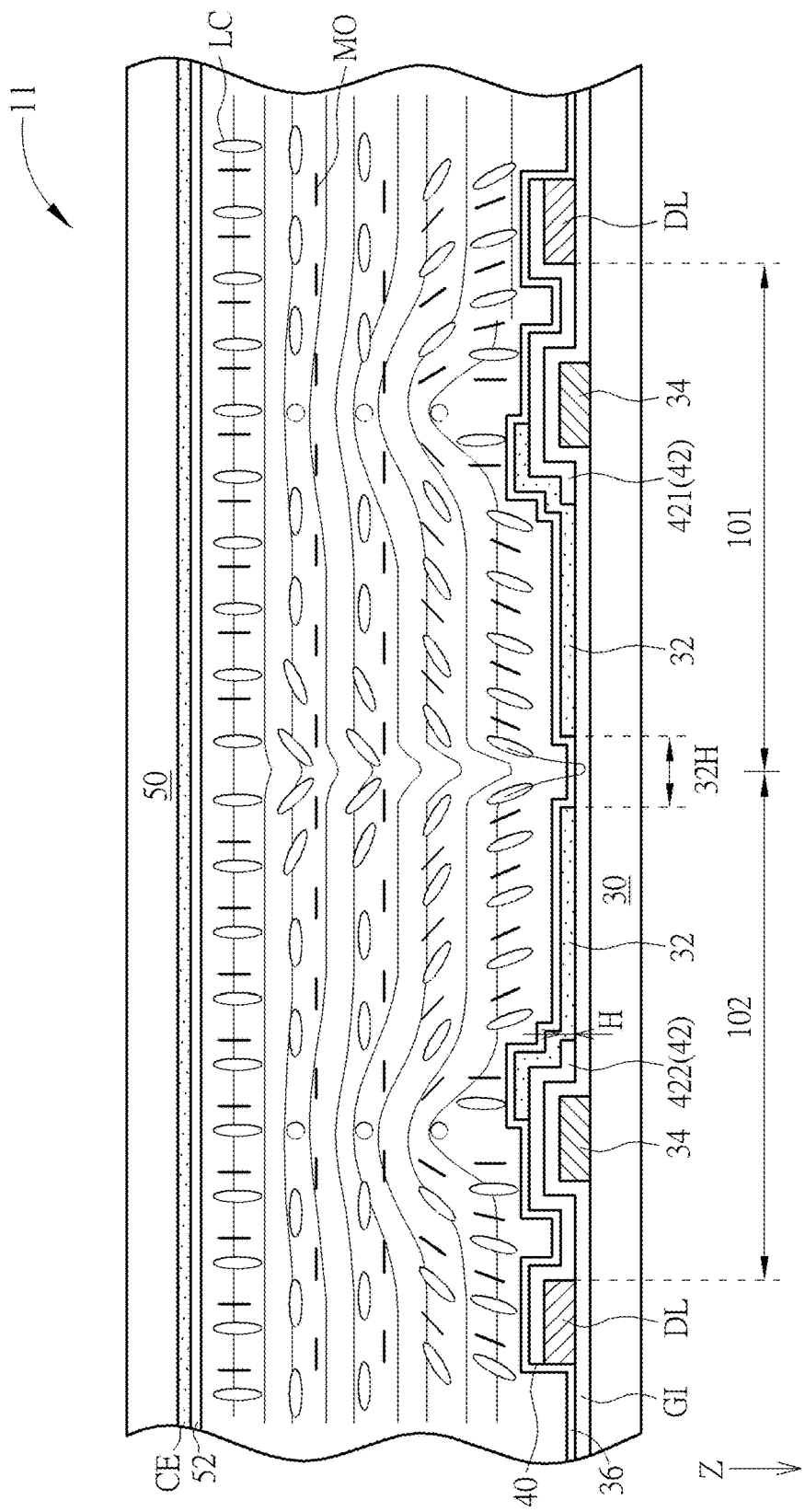
Figure 12:
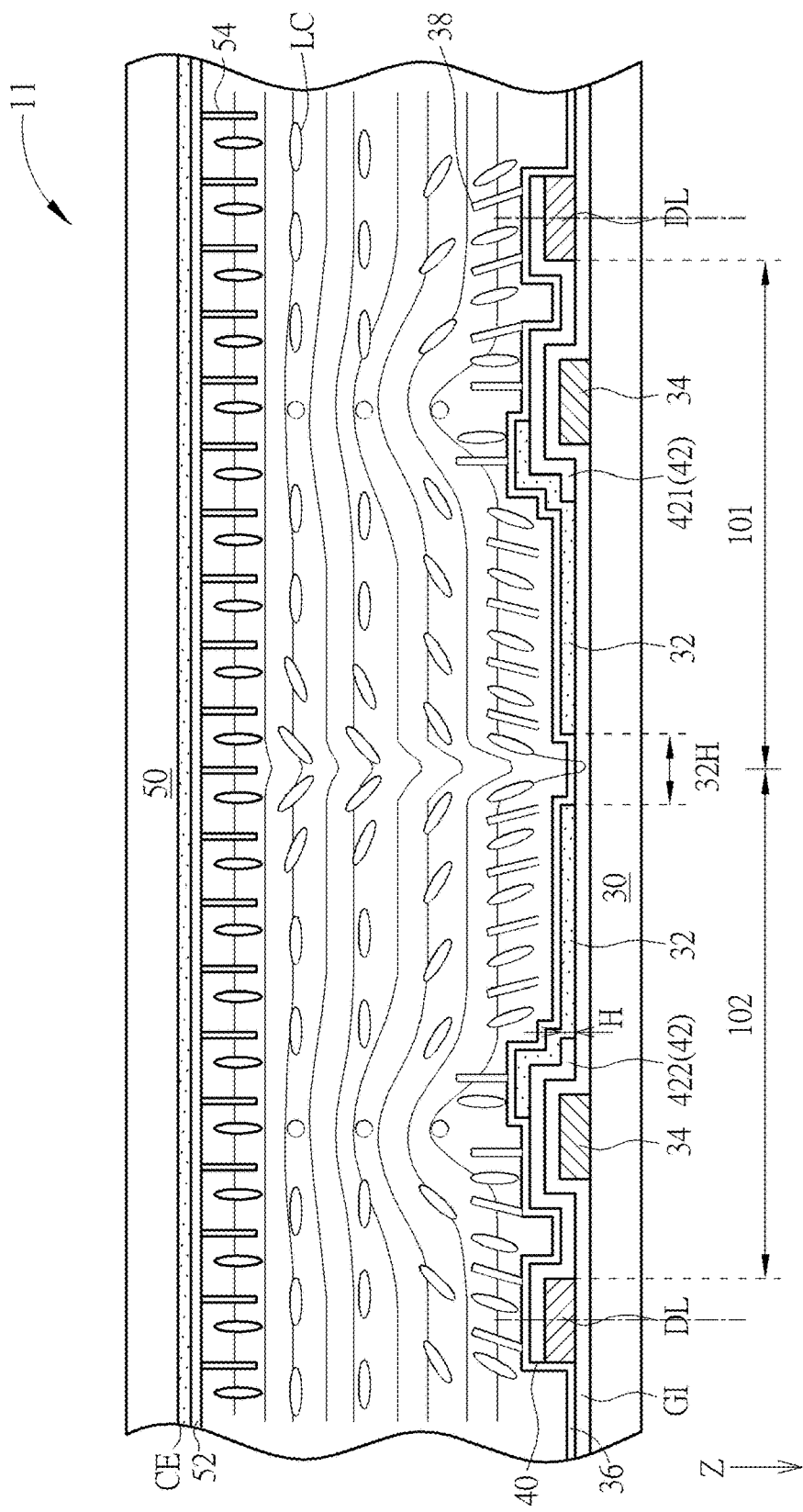

The liquid crystal display panel 11 of the present embodiment is the polymer-stabilized alignment (PSA) liquid crystal display panel, and the liquid crystal molecules LC are aligned by the liquid crystal alignment process. According to the present embodiment, the cross-shaped opening 32H of the pixel electrode 32 may generate intense and uniform fringe field such that the boundary area of the liquid crystal alignment region disposed at two opposite sides of the cross-shaped opening 32H is reduced. In addition, since the inner insulating branches 42 would step onto the auxiliary electrode 34, the ups and downs structure is formed. Owing to the ups and downs structure, the liquid crystal molecules LC located at the edge of the pixel electrode 32 may pretilt along the extending direction of the inner insulating branches 42 when the electric field is provided. The liquid crystal molecules LC may lie down outwards continuously caused by adjusting the electric field in the liquid crystal alignment process, so the dark lines at the centers of boundaries between adjacent alignment regions or the dark lines within the adjacent alignment regions are significantly reduced, such that the transmittance of the liquid crystal panel 11 is increased. The liquid crystal alignment method of the liquid crystal panel will be detailed described as follows. Referring to FIG. 10 to FIG. 11, and also referring to FIG. 5 to FIG. 9, FIG. 10 to FIG. 12 are schematic diagrams illustrating the liquid crystal alignment method of the liquid crystal display panel according to an embodiment of the present disclosure. As shown in FIG. 10, first, the liquid crystal molecules LC of the liquid crystal display panel 11 are mixed with photo-curing alignment monomers MO. As shown in FIG. 11, the common electrode CE is provided with a first voltage, the pixel electrode 32 is provided with a second voltage, and the auxiliary electrode 34 is provided with a third voltage such that a pretilt angle of the liquid crystal molecules LC is formed. In other words, the pretilt angle of the liquid crystal molecules LC of the alignment layer 36 close to the first substrate 30 is generated by the electric field caused by the first voltage, the second voltage and the third voltage. As shown in FIG. 12, under the first voltage, the second voltage and the third voltage, the photo-curing alignment monomers MO are exposed by the light (for example the UV light), and the photo-curing alignment monomers MO are polymerized to form a first alignment layer 38 and a second alignment layer 54 on the first substrate 30 and the second substrate 50 respectively and fix the pretilt angle of the liquid crystal molecules LC. In the present embodiment, the first voltage, the second voltage and the third voltage are different driving voltages, for example a root-mean-square difference value of the third voltage and the first voltage is greater than a root-mean-square difference value of the second voltage and the first voltage. In other words, the electric field between the common electrode CE and the auxiliary electrode 34 is greater than the electric field between the common electrode CE and the pixel electrode 32. The electric power lines corresponding to the cross-shaped opening 32H may be changed by the design of the cross-shaped opening 32H of the pixel electrode 32 (as shown in FIG. 11 and FIG. 12) as the common electrode CE is provided with the first voltage, the pixel electrode 32 is provided with the second voltage and the auxiliary electrode 34 is provided with the third voltage respectively. Thus, the intense and uniform fringe field is formed between the pixel electrode 32 and the common electrode CE. The liquid crystal molecules LC corresponding to the cross-shaped opening 32H may pretilt outwardly (around the periphery of the pixel electrode 32), so the boundary area of the alignment region located at the two opposite sides of the cross-shaped opening 32H may be decreased and the generation of the cross-shaped dark lines are decreased as well. In addition, since the inner insulating branches 42 would step onto the auxiliary electrode 34 and forms the ups and downs structure, the pixel electrode 32 above the auxiliary electrode 34 may have a bump structure due to the auxiliary electrode 34. Therefore, adjusting the electric field distribution of this area during the liquid crystal alignment process may let the liquid crystal molecules LC lie down outwards continuously and pretilt along the extending direction of the inner insulating branches 42. As such, the dark lines at the centers of boundaries between adjacent alignment regions or the dark lines within the adjacent alignment regions are significantly reduced, and the transmittance of the liquid crystal panel 11 is increased.

The third voltage provided for the auxiliary electrode 34 may be equal to the first voltage provided for the common electrode CE. For example, the second voltage and the third voltage are ground voltage. In addition, changing the second voltage (the pixel voltage) of the pixel electrode 32 may control the pretilt angle of the liquid crystal molecules LC such that the gray level may be adjusted.

The liquid crystal display panel and the liquid crystal alignment method are not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described. In part of the embodiments below, in order to highlight the characteristics of the present disclosure, the active switching devices, the gate lines and the data lines are omitted in the figures, and only the patterned insulating layer, the auxiliary electrode and the pixel electrodes are illustrated.

Figure 13:
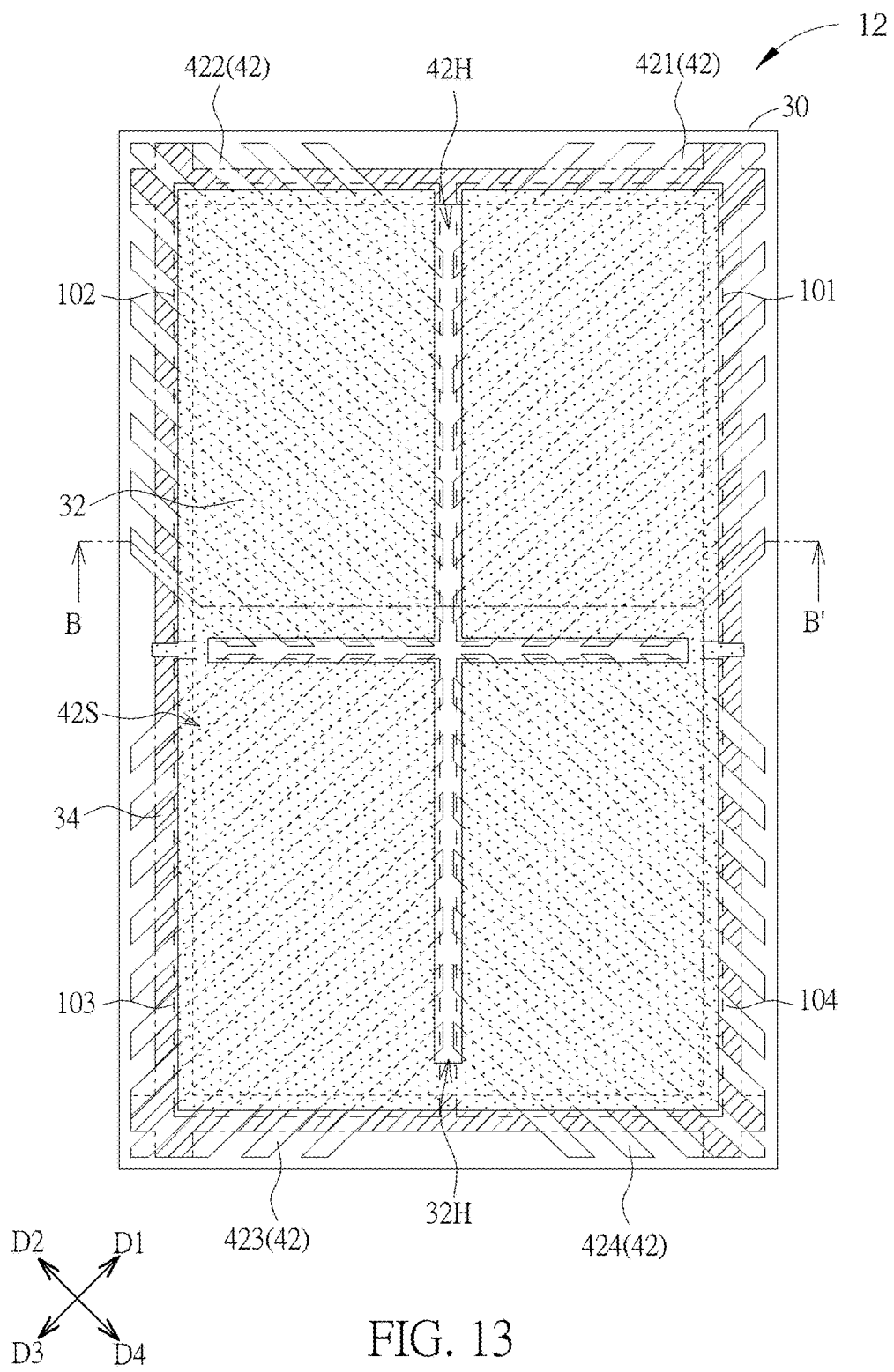
FIG. 13 is a top view of a liquid crystal display panel according to a second embodiment of the present disclosure.
Figure 14:
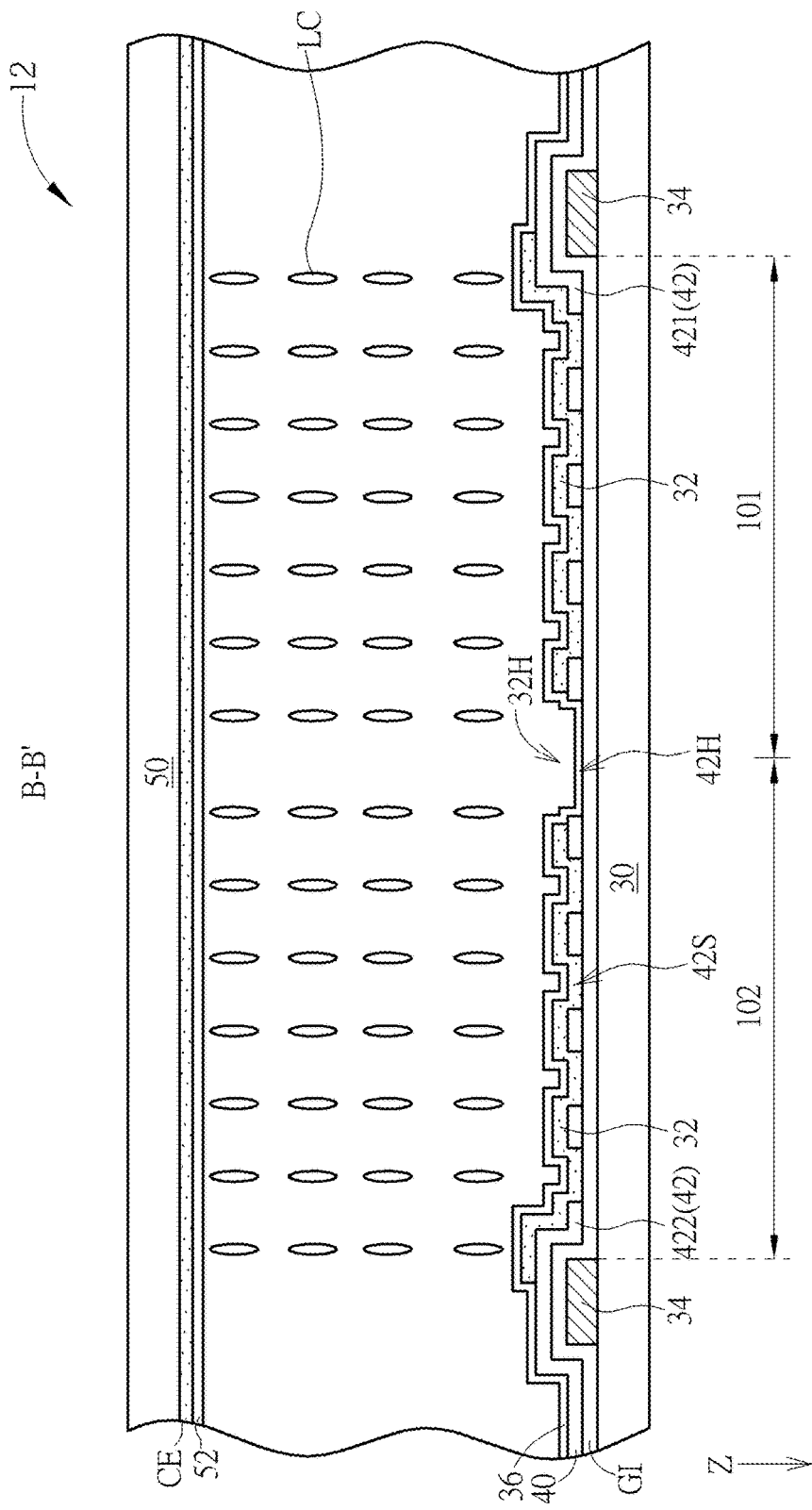
FIG. 14 is a cross-sectional view taken along line B-B' of the liquid crystal display panel in FIG. 13.

Referring to FIG. 13 and FIG. 14, FIG. 13 is a top view of a liquid crystal display panel according to a second embodiment of the present disclosure, and FIG. 14 is a cross-sectional view taken along line B-B' of the liquid crystal display panel in FIG. 13. As shown in FIG. 13 and FIG. 14, different from the first embodiment, in the second embodiment of the liquid crystal display panel 12, the inner insulating branches 42 of the patterned insulating layer 40 protrude from the outer side of the auxiliary electrode 32 and extend toward the inner side of the pixel, but not limited thereto. In the present embodiment, the inner insulating branches 42 of the patterned insulating layer 40 extend further toward the center of boundaries between adjacent alignment regions, but the inner insulating branches 42 are not connected to each other such that an opening 42H is formed. Specifically, the first inner insulating branches 421, the second inner insulating branches 422, the third inner insulating branches 423 and the fourth inner insulating branches 424 are respectively located in the first alignment region 101, the second alignment region 102, the third alignment region 103 and the fourth alignment region 104. The first inner insulating branches 421, the second inner insulating branches 422, the third inner insulating branches 423 and the fourth inner insulating branches 424 are separated from each other by the opening 42H. In the second embodiment, the opening 42H between the inner insulating branches 42 of the patterned insulating layer may be a cross-shaped opening, which may be substantially corresponding to the cross-shaped opening 32H of the pixel electrode 32, but not limited thereto. The opening 42H may be any shape. Further, in the second embodiment, the pixel electrode 32 simultaneously partially overlaps the inner insulating branches 42 of the patterned insulating layer 40 and the auxiliary electrode 42 in the vertical projection direction Z, and the pixel electrode 32 does not protrude from the outer side of the auxiliary electrode 42, but not limited thereto.

Figure 15:
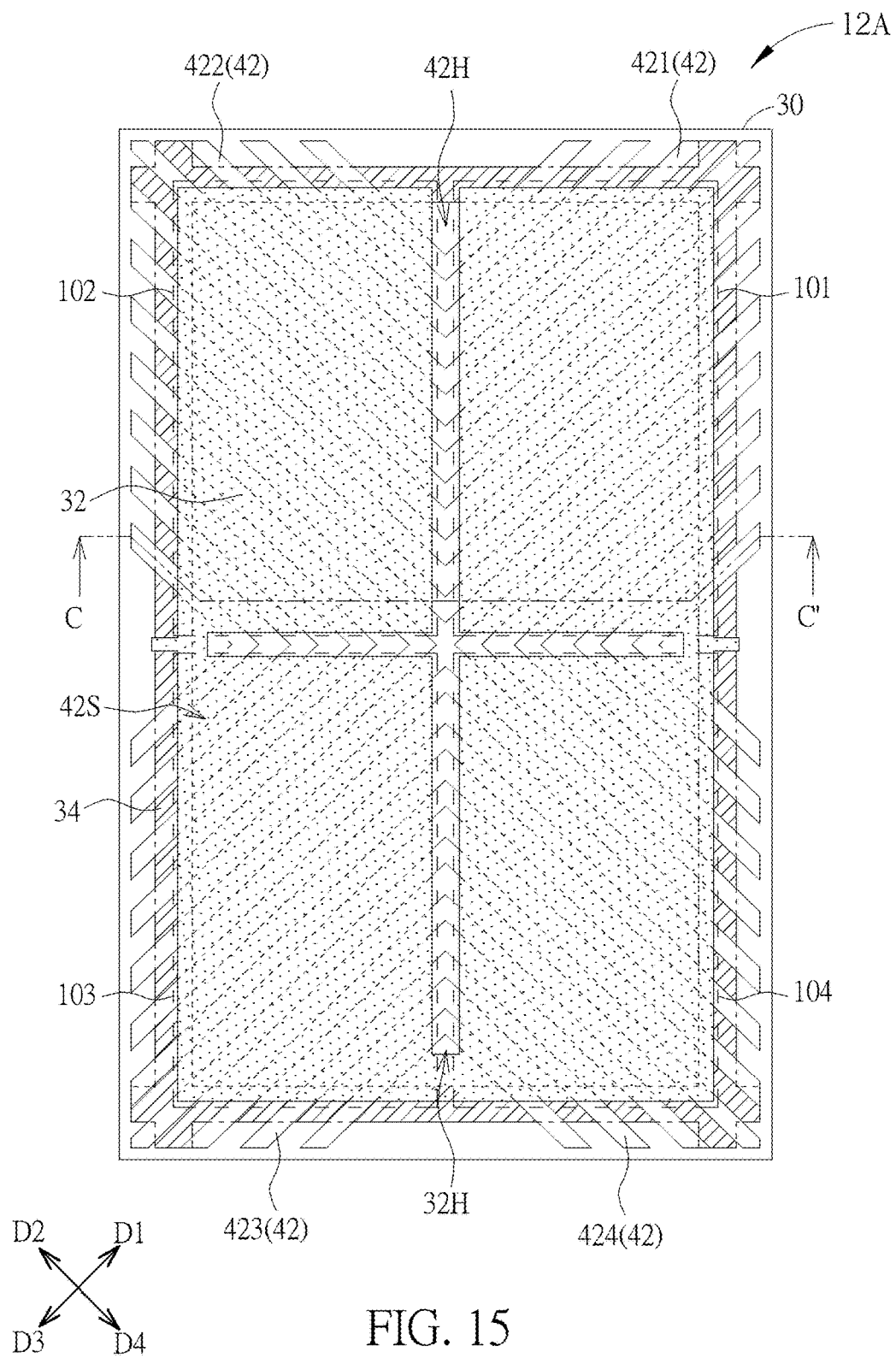
FIG. 15 is a top view of a liquid crystal display panel according to a variant embodiment of the second embodiment of the present disclosure.
Figure 16:
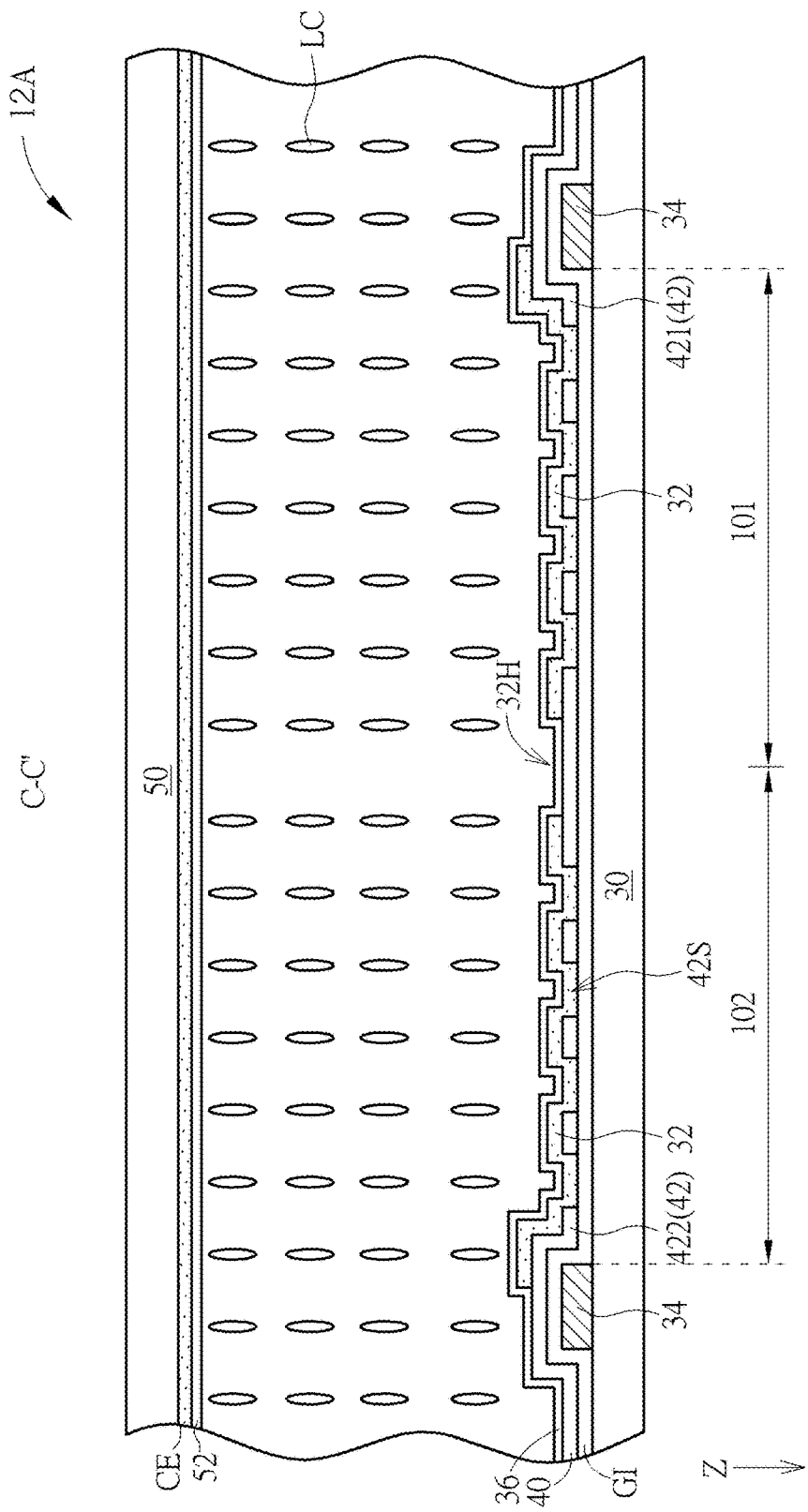
FIG. 16 is a cross-sectional view taken along line C-C' of the liquid crystal display panel in FIG. 15.

Referring to FIG. 15 and FIG. 16, FIG. 15 is a top view of a liquid crystal display panel according to a variant embodiment of the second embodiment of the present disclosure, and FIG. 16 is a cross-sectional view taken along line C-C' of the liquid crystal display panel in FIG. 15. As shown in FIG. 15 and FIG. 16, different from the second embodiment, in the liquid crystal display panel 12A of the variant embodiment, the inner insulating branches 42 of the patterned insulating layer 40 extend further inwardly, wherein an end of each of the inner insulating branches 42 is connected to an end of other inner insulating branches 42. For example, partially of the inner insulating branches 42 in the first alignment region 101 is connected to partially of the inner insulating branches 42 in the second alignment region 102, another partially of the inner insulating branches 42 in the first alignment region 101 is connected to partially of the inner insulating branches 42 in the fourth alignment region 104, another partially of the inner insulating branches 42 in the second alignment region 102 is connected to partially of the inner insulating branches 42 in the third alignment region 103, another partially of the inner insulating branches 42 in the third alignment region 103 is connected to another partially of the inner insulating branches 42 in the fourth alignment region 104.

Figure 17:
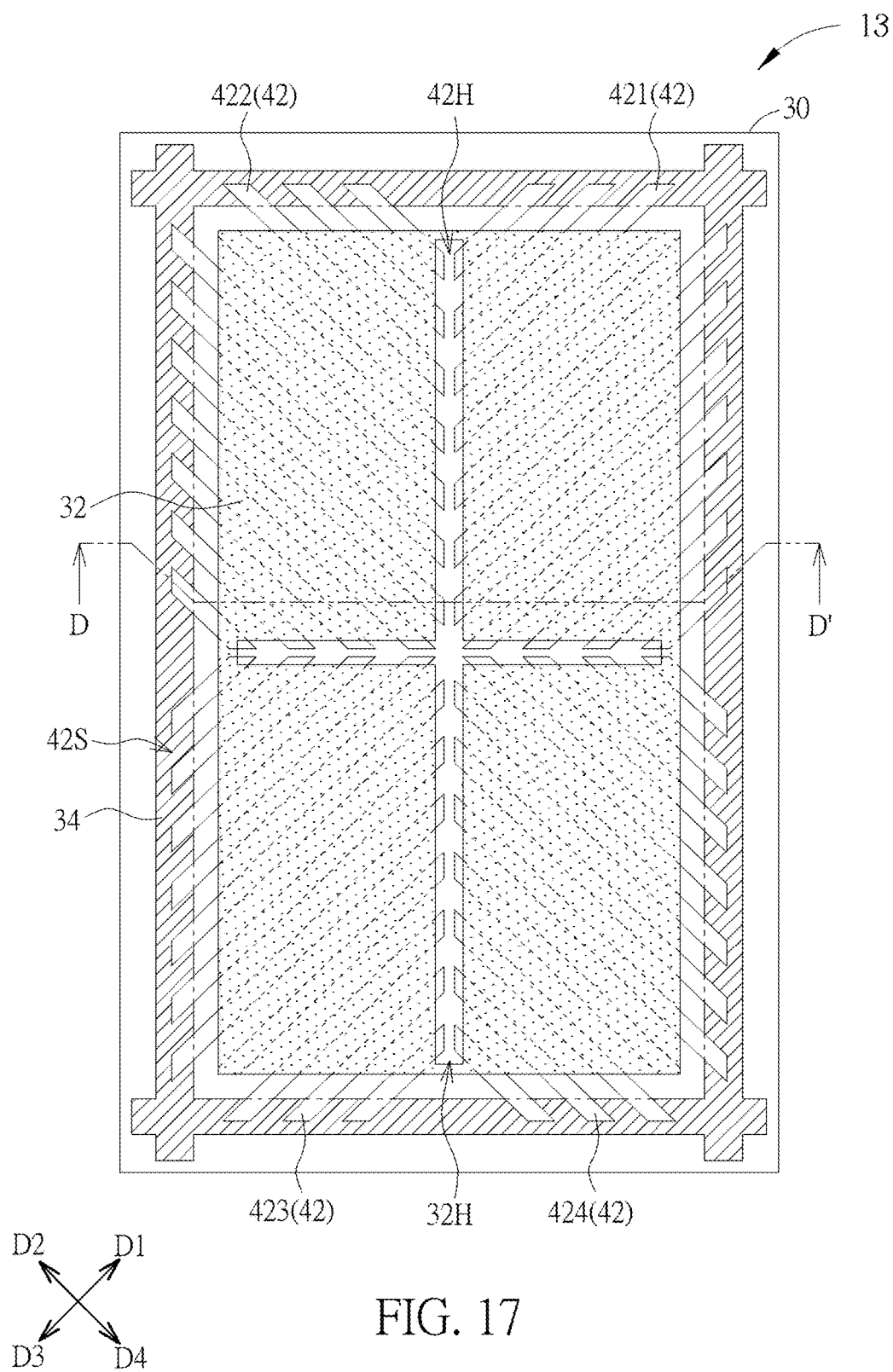
FIG. 17 is a top view of a liquid crystal display panel according to a third embodiment of the present disclosure.
Figure 18:
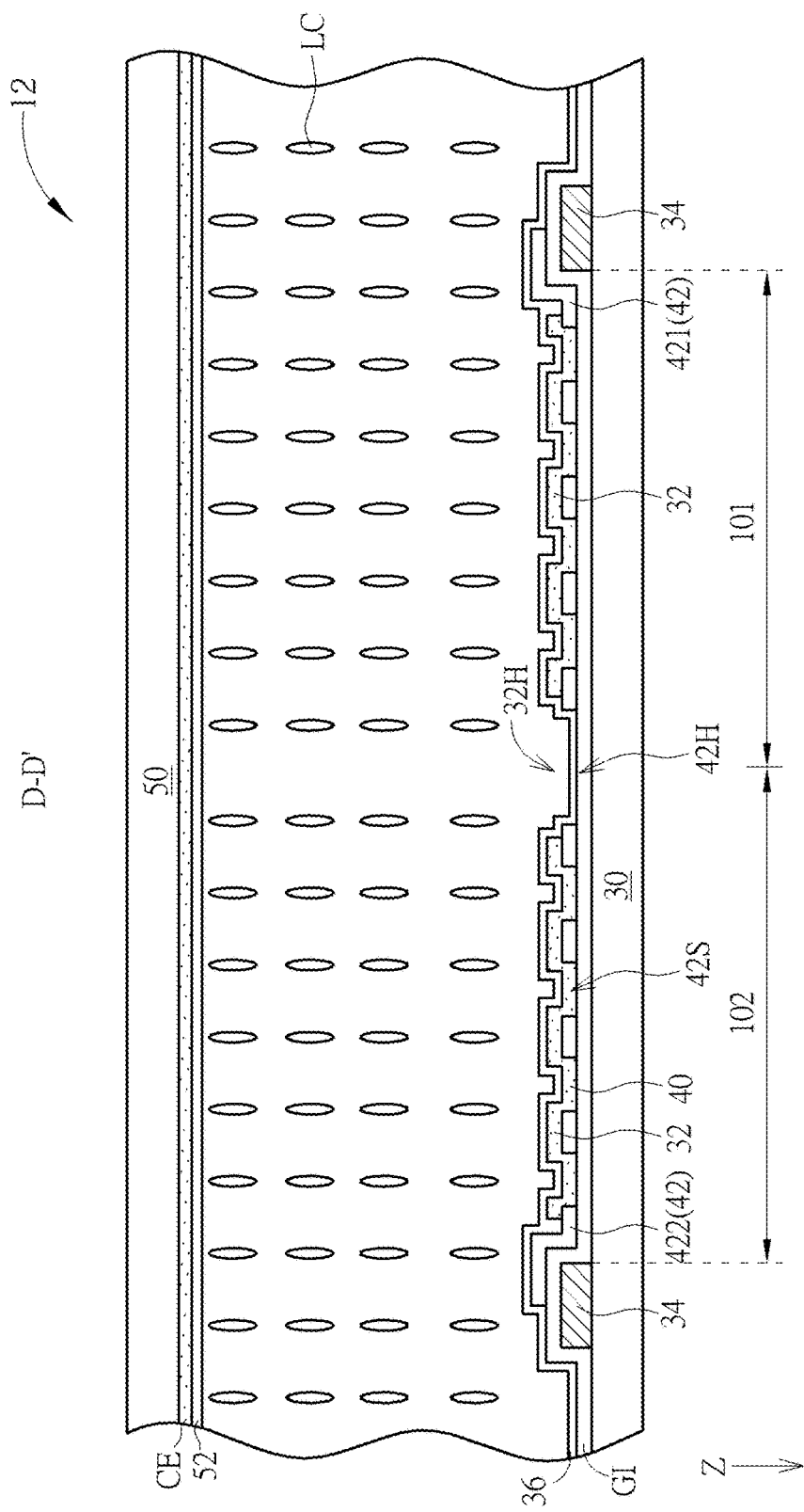
FIG. 18 is a cross-sectional view taken along line D-D' of the liquid crystal display panel in FIG. 17.

Referring to FIG. 17 and FIG. 18, FIG. 17 is a top view of a liquid crystal display panel according to a third embodiment of the present disclosure, and FIG. 18 is a cross-sectional view taken along line D-D' of the liquid crystal display panel in FIG. 17. As shown in FIG. 17 and FIG. 18, different from the second embodiment, in the liquid crystal display panel 13 of the third embodiment, the inner insulating branches 42 of the patterned insulating layer 40 only partially overlap the auxiliary electrode 42 in the vertical projection direction Z, but the inner insulating branches 42 do not protrude from the outer side of the auxiliary electrode 42. In addition, the pixel electrode 32 may only partially overlap the inner insulating branches 42 of the patterned insulating layer 40 in the vertical projection direction Z, but the pixel electrode 32 does not overlap and the auxiliary electrode 42 in the vertical projection direction Z.

Figure 19:
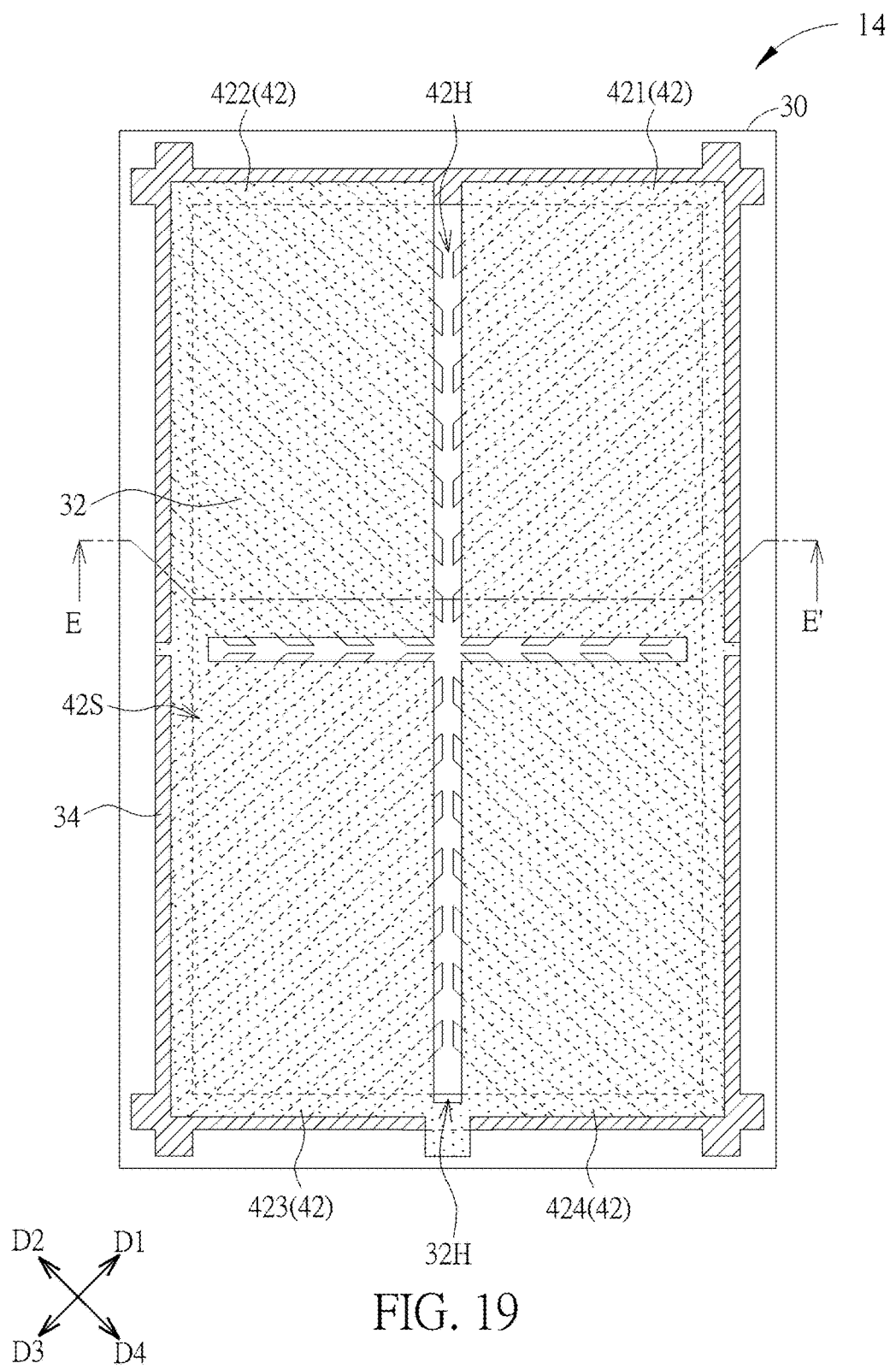
FIG. 19 is a top view of a liquid crystal display panel according to a fourth embodiment of the present disclosure.
Figure 20:
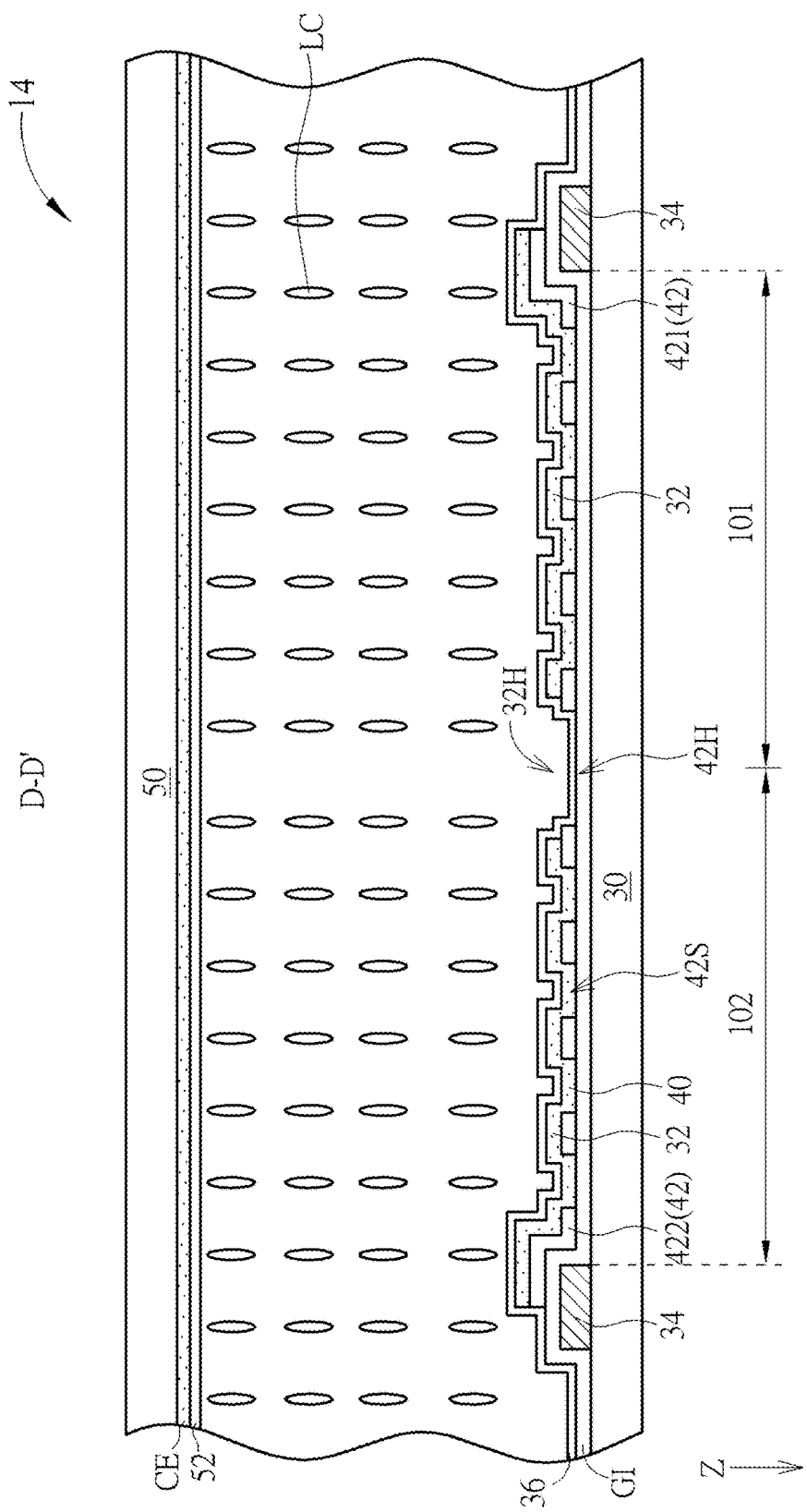
FIG. 20 is a cross-sectional view taken along line E-E' of the liquid crystal display panel in FIG. 19.

Referring to FIG. 19 and FIG. 20, FIG. 19 is a top view of a liquid crystal display panel according to a fourth embodiment of the present disclosure, and FIG. 20 is a cross-sectional view taken along line E-E' of the liquid crystal display panel in FIG. 19. As shown in FIG. 19 and FIG. 20, different from the third embodiment, in the liquid crystal display panel 14 of the fourth embodiment, the pixel electrode 32 partially overlaps the inner insulating branches 42 of the patterned insulating layer 40 and the auxiliary electrode 42 in the vertical projection direction Z. In addition, both the inner insulating branches 42 and the pixel electrode do not protrude from the outer side of the auxiliary electrode 34.

Figure 21:
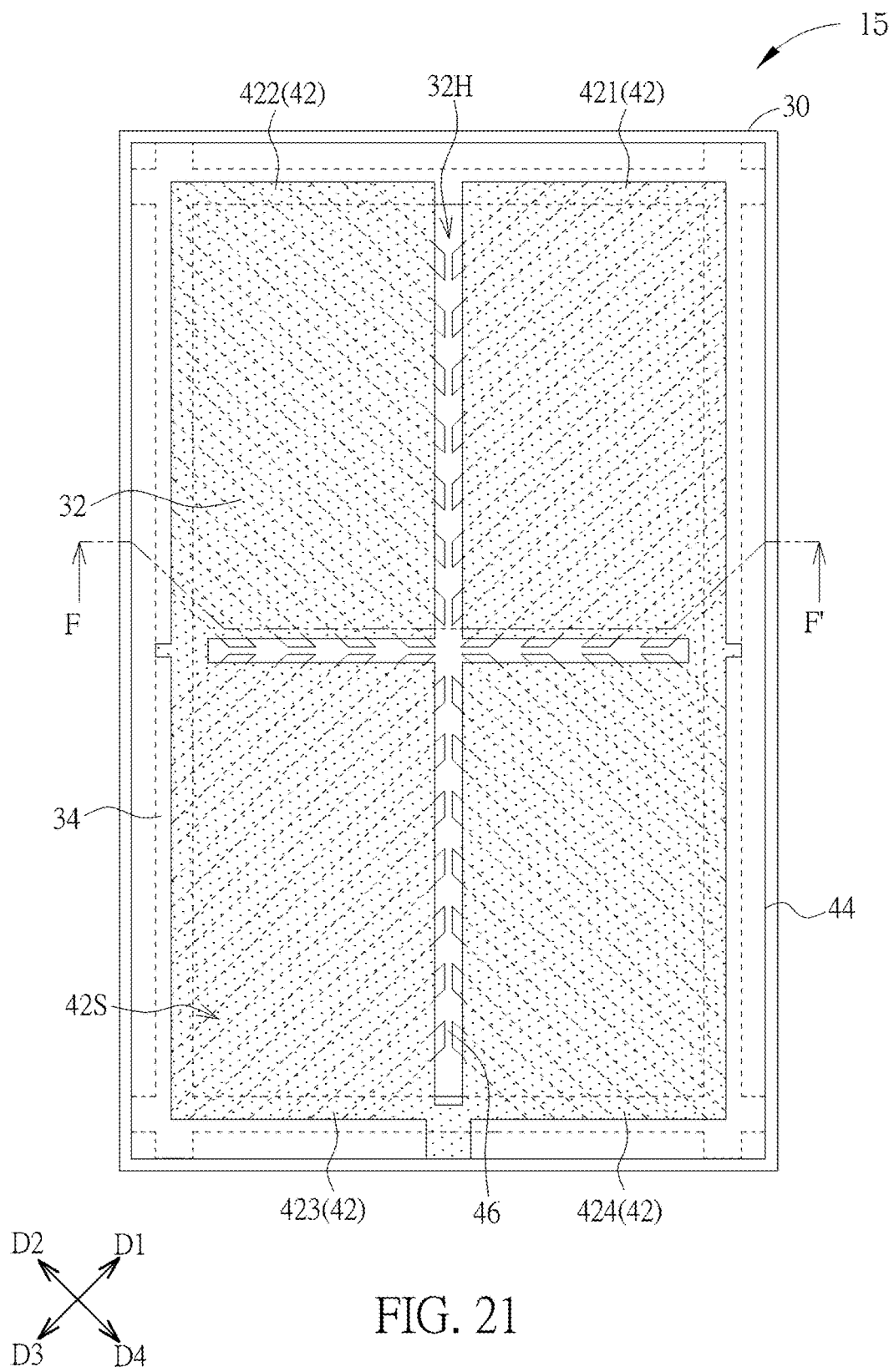
FIG. 21 is a top view of a liquid crystal display panel according to a fifth embodiment of the present disclosure.
Figure 22:
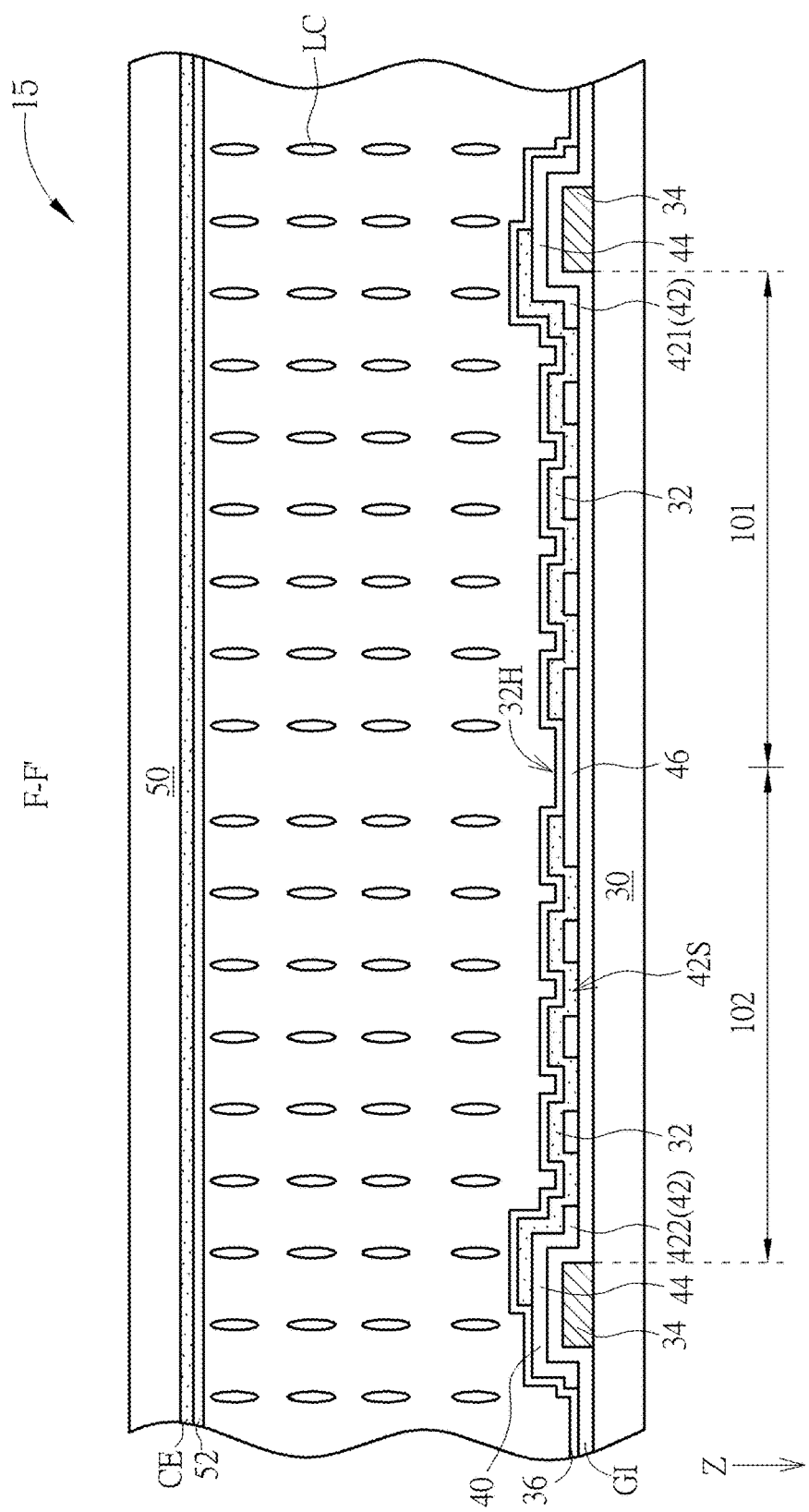
FIG. 22 is a cross-sectional view taken along line F-F' of the liquid crystal display panel in FIG. 21.

Referring to FIG. 21 and FIG. 22, FIG. 21 is a top view of a liquid crystal display panel according to a fifth embodiment of the present disclosure, and FIG. 22 is a cross-sectional view taken along line F-F' of the liquid crystal display panel in FIG. 21. As shown in FIG. 21 and FIG. 22, different from the foregoing embodiments, in the liquid crystal display panel 15 of the fifth embodiment, the patterned insulating layer 40 further includes an insulating frame 44 and the insulating main body 46. The insulating frame 44 has a multi-frame-shaped pattern, e.g., a rectangular frame, wherein the insulating frame 44 surrounds the inner insulating branches 42, an end of each of the inner insulating branches 42 is connected to an inner side of the insulating frame 44, and the insulating frame 44 partially overlaps the auxiliary electrode 34 in the vertical projection direction Z. In addition, the inner insulating branches 42 may overlap the auxiliary electrode 34 in the vertical projection direction Z or may not overlap the auxiliary electrode 34 in the vertical projection direction Z. The insulating frame 44 partially overlaps the auxiliary electrode 34 in the vertical projection direction Z. The insulating main body 46 is disposed between the inner insulating branches 42 located in each alignment regions, and another end of each of the inner insulating branches 42 is connected to the insulating main body 46. The insulating main body 46 may have a cross-shaped, but not limited thereto.

Figure 23:
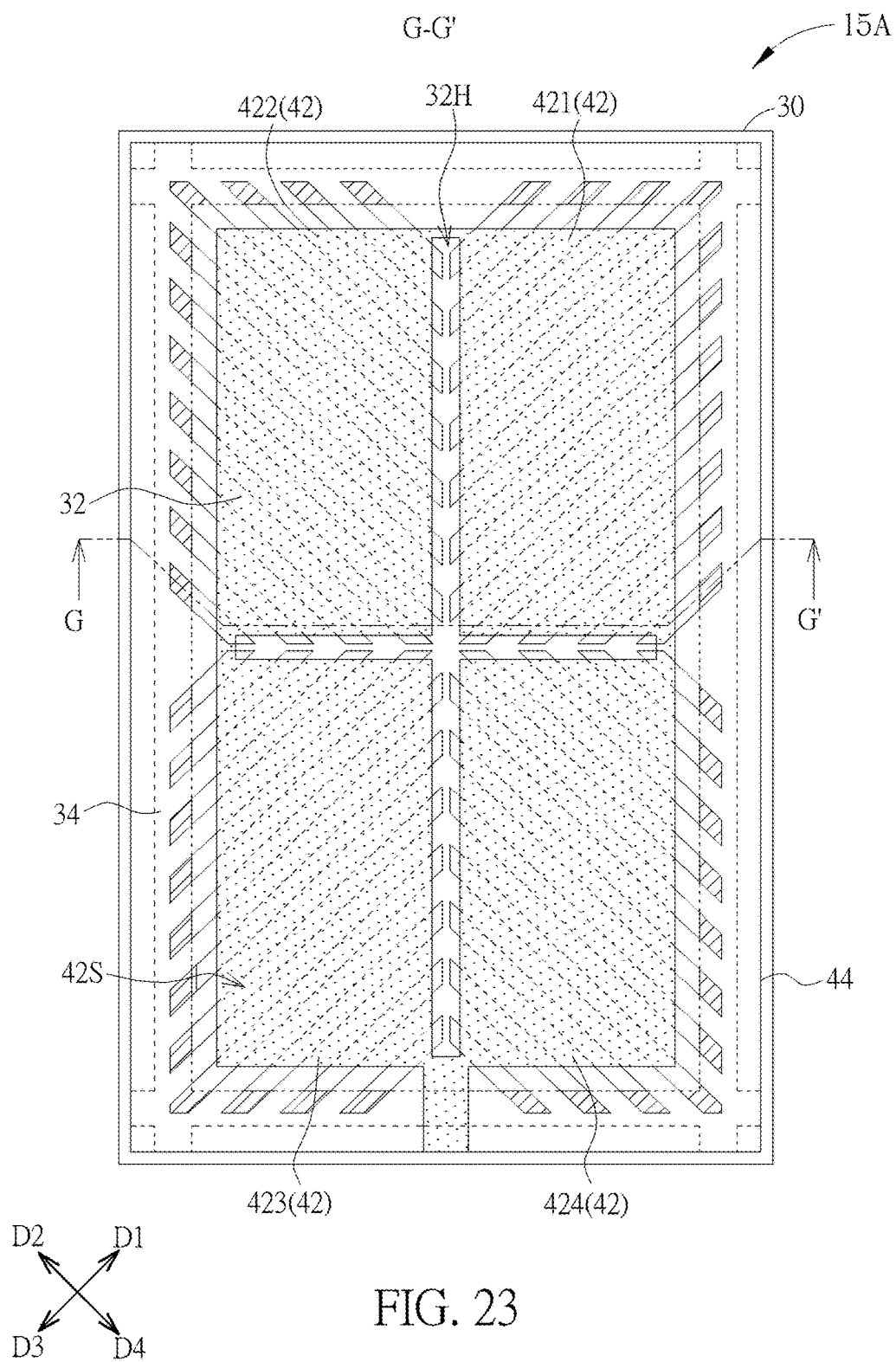
FIG. 23 is a top view of a liquid crystal display panel according to a variant embodiment of the fifth embodiment of the present disclosure.
Figure 24:
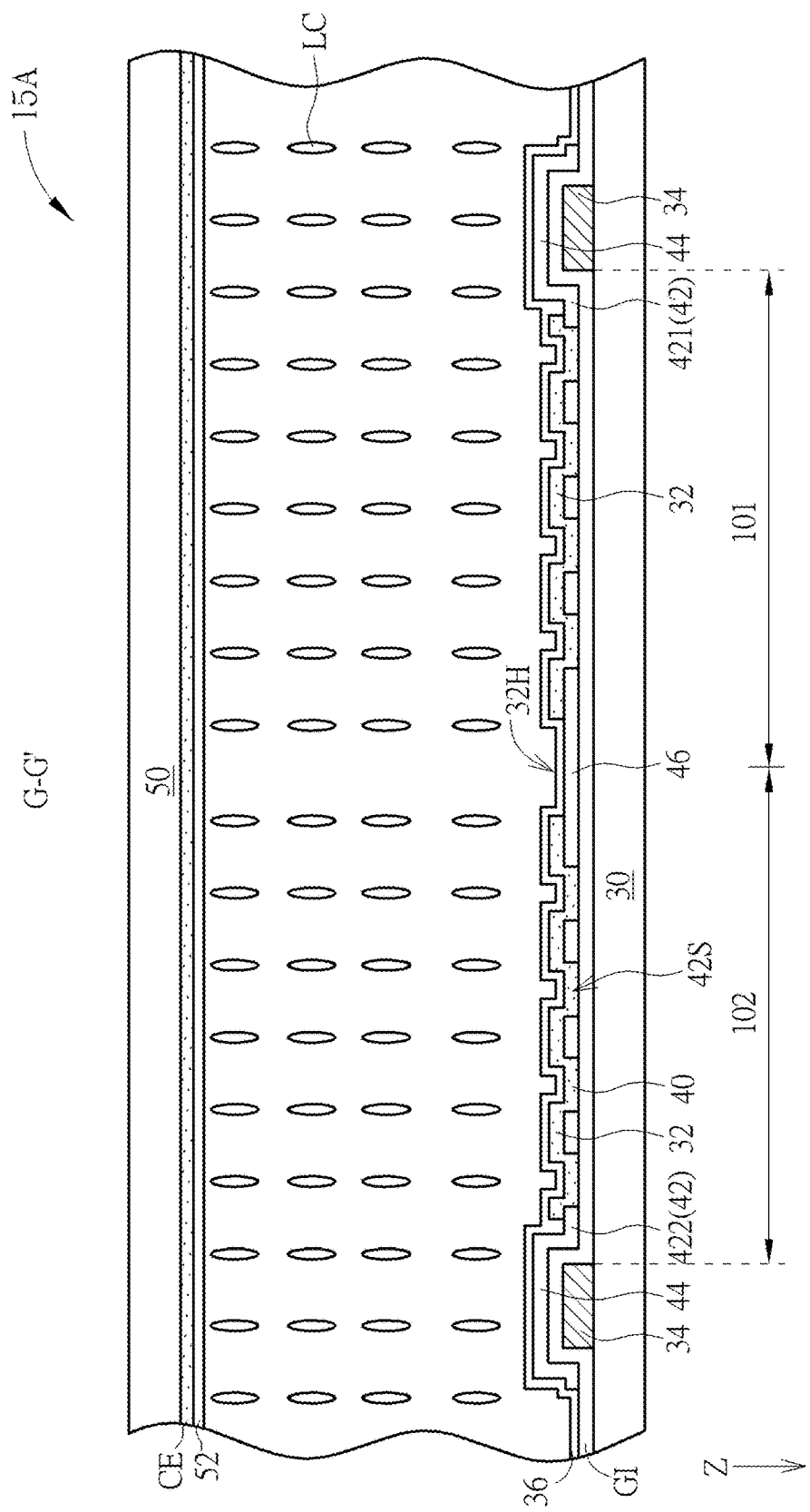
FIG. 24 is a cross-sectional view taken along line G-G' of the liquid crystal display panel in FIG. 23.

Referring to FIG. 23 and FIG. 24, FIG. 23 is a top view of a liquid crystal display panel according to a variant embodiment of the fifth embodiment of the present disclosure, and FIG. 24 is a cross-sectional view taken along line G-G' of the liquid crystal display panel in FIG. 23. As shown in FIG. 23 and FIG. 24, different from the fifth embodiment, in the liquid crystal display panel 15A of the variant embodiment, both the insulating frame 44 and the inner insulating branches 42 partially overlap the auxiliary electrode 34 in the vertical projection direction Z. In addition, the pixel electrode 32 does not overlap the insulating frame 44 and the auxiliary electrode 34.

In the above-described embodiments, the auxiliary electrode 34 is disposed under the patterned insulating layer 40, but not limited thereto. The following description will continue to introduce liquid crystal display panels of other embodiments of the present disclosure.

Figure 25:
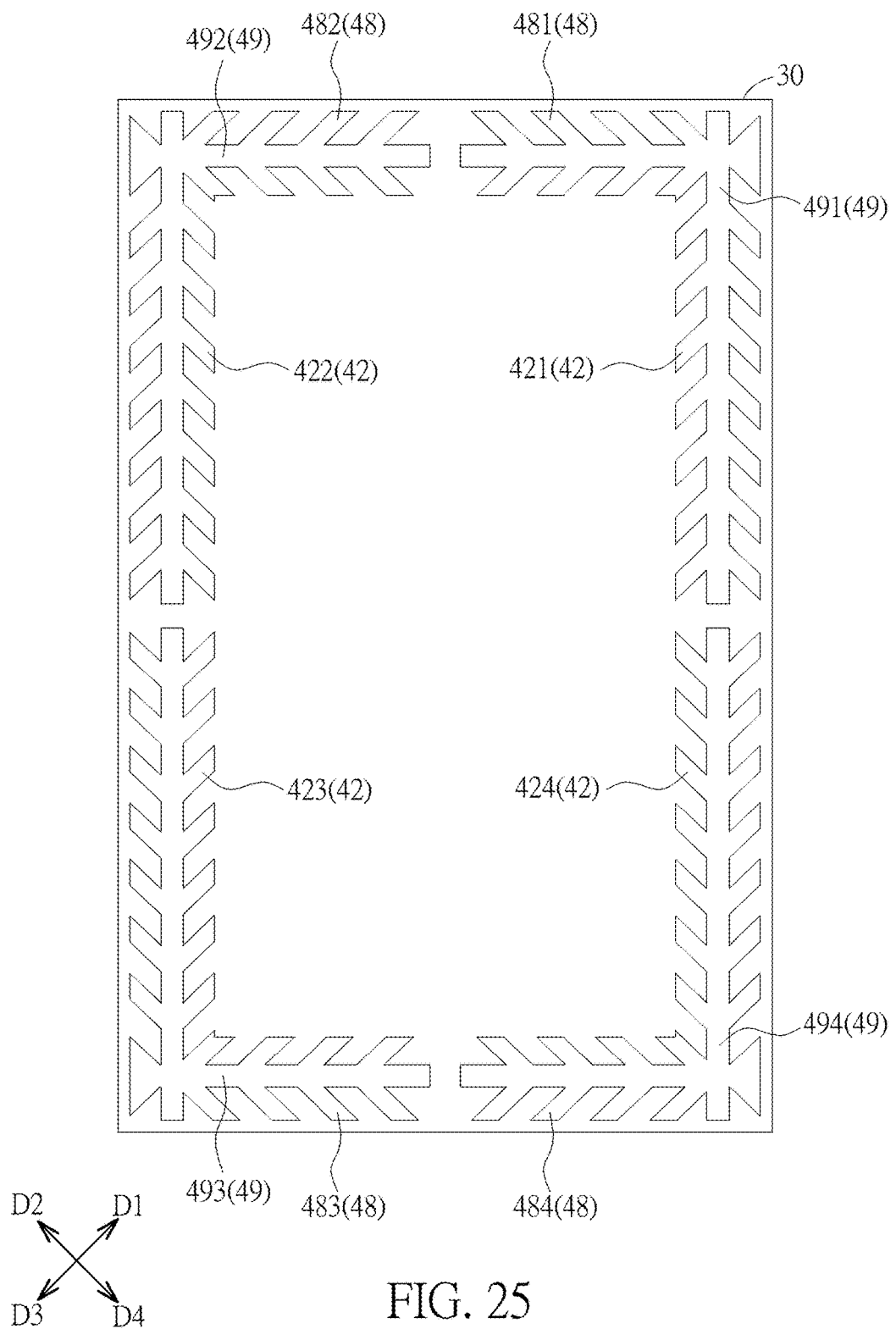
FIG. 25 is a top view of a patterned insulating layer of the liquid crystal display panel according to a sixth embodiment of the present disclosure.
Figure 26:
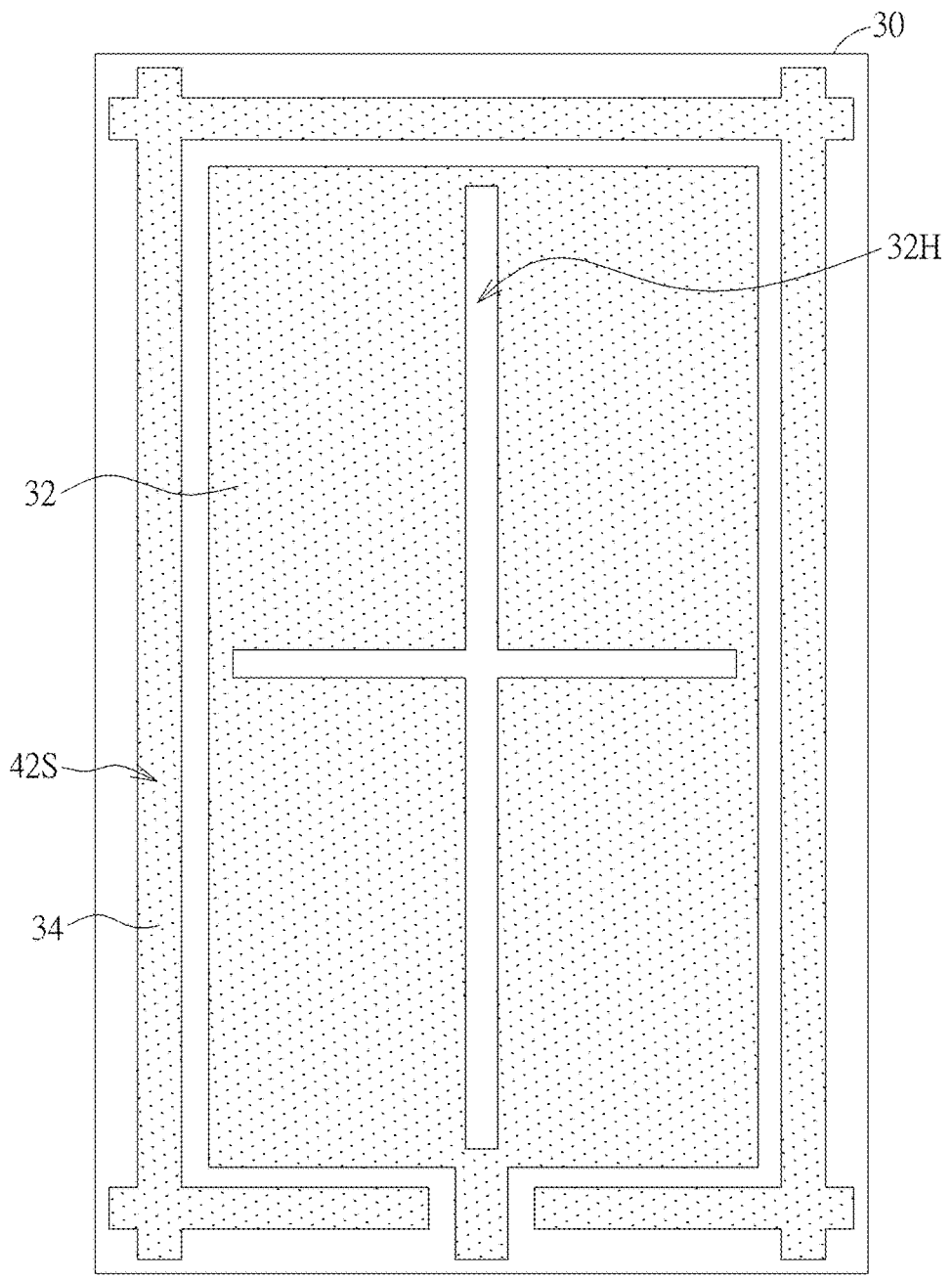
FIG. 26 is a top view of a pixel electrode and an auxiliary electrode of the liquid crystal display panel according to the sixth embodiment of the present disclosure.
Figure 26:
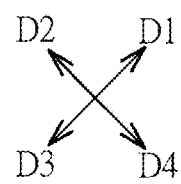
Figure 27:
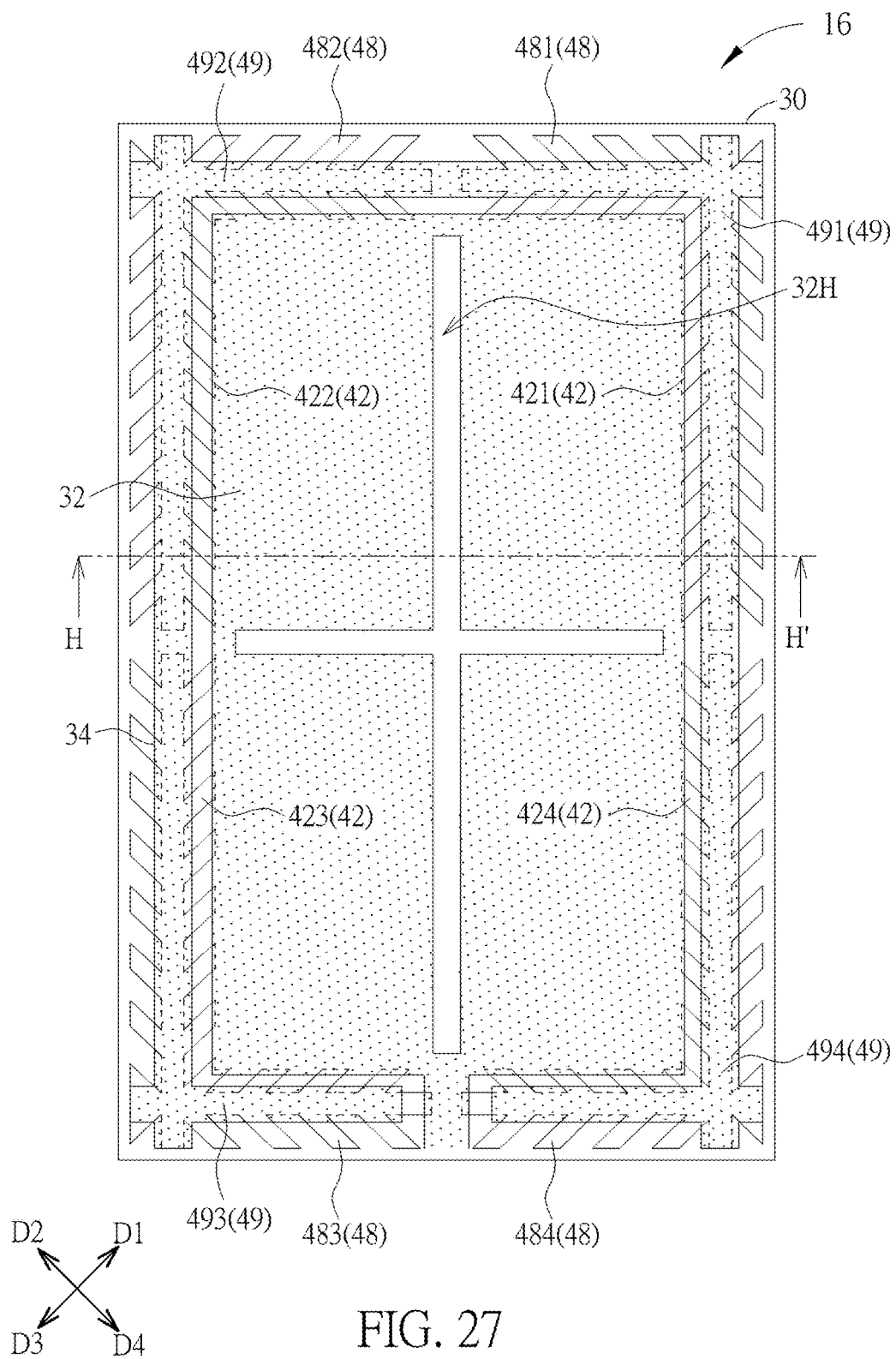
FIG. 27 is a top view of the liquid crystal display panel according to the sixth embodiment of the present disclosure.
Figure 28:
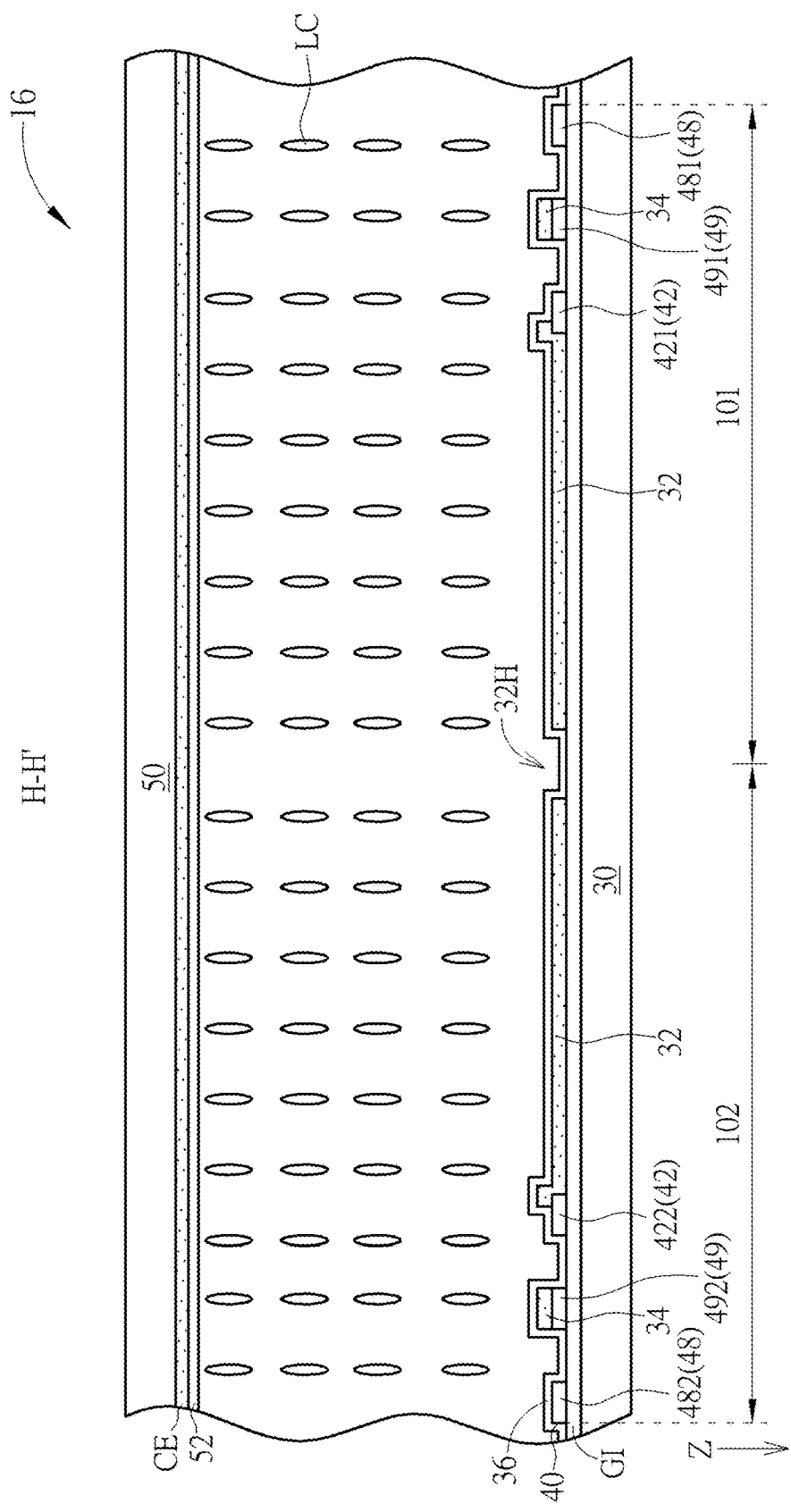
FIG. 28 is a cross-sectional view taken along line H-H' of the liquid crystal display panel in FIG. 27.

Referring to FIG. 25 to FIG. 28, FIG. 25 is a top view of a patterned insulating layer of the liquid crystal display panel according to a sixth embodiment of the present disclosure, FIG. 26 is a top view of a pixel electrode and an auxiliary electrode of the liquid crystal display panel according to the sixth embodiment of the present disclosure, FIG. 27 is a top view of the liquid crystal display panel according to the sixth embodiment of the present disclosure, and FIG. 28 is a cross-sectional view taken along line H-H' of the liquid crystal display panel in FIG. 27. In the liquid crystal display panel 16 of the present embodiment, the pixel electrode 32 and the auxiliary electrode 34 are disposed on the patterned insulating layer 40, for example, the auxiliary electrode 32 and the pixel electrode 34 are a same patterned conductive layer, but not limited thereto. As shown in FIG. 25, the patterned insulating layer 40 of the present embodiment includes a plurality of insulating frames 49, wherein each of the insulating frames 49 is an L-shaped pattern. The insulating frame 49 may include a first insulation frame 491, a second insulating frame 492, a third insulating frame 493, and a fourth insulating frame 494, respectively disposed at the outer edge of the first alignment region 101, the second alignment region 102, the third alignment region 103 and the fourth alignment region 104. The patterned insulating layer 40 includes inner insulating branches 42, wherein the inner insulating branches 42 may include a plurality of first inner insulating branches 421 extending toward the first direction D1 (in other words, inner insulating branches 421 are located at L-shaped outer extending toward the third direction D3), a plurality of second inner insulating branches 422 extending toward the second direction D2 (in other words, inner insulating branches 422 are located at L-shaped outer extending toward the fourth direction D4), a plurality of third inner insulating branches 423 extending toward the third direction D3 (in other words, inner insulating branches 423 are located at L-shaped outer extending toward the first direction D1), and a plurality of fourth inner insulating branches 424 extending toward the fourth direction D4 (in other words, inner insulating branches 424 are located at L-shaped outer extending toward the first direction D2). In addition, the patterned insulating layer 40 further includes a plurality of first outer insulating branches 481, a plurality of second outer insulating branches 482, a plurality of third outer insulating branches 483, and a plurality of fourth outer insulating branches 484. The first insulating frame 491 is disposed between the first inner insulating branches 421 and the first outer insulating branches 481, wherein an end of each of the first inner insulating branches 421 is connected to an L-shaped inner side of the first insulating frame 491, and an end of each of the first outer insulating branches 491 is connected to an L-shaped outer side of the first insulating frame 491. The second insulating frame 492 is disposed between the second inner insulating branches 422 and the second outer insulating branches 482, wherein an end of each of the second inner insulating branches 422 is connected to an L-shaped inner side of the second insulating frame 492, and an end of each of the second outer insulating branches 492 is connected to an L-shaped outer side of the second insulating frame 492. The third insulating frame 493 is disposed between the third inner insulating branches 423 and the third outer insulating branches 483, wherein an end of each of the third inner insulating branches 423 is connected to an L-shaped inner side of the third insulating frame 493, and an end of each of the third outer insulating branches 493 is connected to an L-shaped outer side of the third insulating frame 493. The fourth insulating frame 494 is disposed between the fourth inner insulating branches 424 and the fourth outer insulating branches 484, wherein an end of each of the fourth inner insulating branches 424 is connected to an L-shaped inner side of the fourth insulating frame 494, and an end of each of the fourth outer insulating branches 494 is connected to an L-shaped outer side of the fourth insulating frame 494.

The first outer insulating branches 481 are located at the outer side of the first insulating frame 491, wherein a first portion of the first outer insulating branches 481 (the first outer insulating branches 481 located at the short side of the L-shaped pattern) extends in the second direction D2, and a second portion of the first outer insulating branches 481 (the first outer insulating branches 481 located at the long side of the L-shaped pattern) extends in the fourth direction D4. As such, the first insulating frame 491, the first outer insulating branches 481 and the first inner insulating branches 421 constitutes an L-shaped fishbone pattern. The second outer insulating branches 482 are located at the outer side of the second insulating frame 492, wherein a first portion of the second outer insulating branches 482 (the second outer insulating branches 482 located at the short side of the L-shaped pattern) extends in the first direction D1, and a second portion of the second outer insulating branches 482 (the second outer insulating branches 482 located at the long side of the L-shaped pattern) extends in the third direction D3. Similarly, the second insulating frame 492, the second outer insulating branches 482 and the second inner insulating branches 422 constitutes an L-shaped fishbone pattern. The third outer insulating branches 483 are located at the outer side of the third insulating frame 493, wherein a first portion of the third outer insulating branches 483 (the third outer insulating branches 483 located at the long side of the L-shaped pattern) extends in the second direction D2, and a second portion of the third outer insulating branches 483 (the third outer insulating branches 483 located at the short side of the L-shaped pattern) extends in the fourth direction D4. Therefore, the third insulating frame 493, the third outer insulating branches 483 and the third inner insulating branches 423 constitutes an L-shaped fishbone pattern. The fourth outer insulating branches 484 are located at the outer side of the fourth insulating frame 494, wherein a first portion of the fourth outer insulating branches 484 (the fourth outer insulating branches 484 located at the long side of the L-shaped pattern) extends in the first direction D1, and a second portion of the fourth outer insulating branches 484 (the fourth outer insulating branches 484 located at the short side of the L-shaped pattern) extends in the third direction D3. Likewise, the fourth insulating frame 494, the fourth outer insulating branches 484 and the fourth inner insulating branches 424 constitutes an L-shaped fishbone pattern.

As shown in FIG. 26, the pixel electrode 32 and the auxiliary electrode 34 of the sixth embodiment are a same patterned conductive layer and are disposed above the patterned insulating layer 40, which is different from the auxiliary electrode 34 of the foregoing embodiments that is disposed under the patterned insulating layer 40. In one embodiment, the pixel electrode 32 and the auxiliary electrode 34 are separated from each other. Since the electric field distributions and the structures of the two approaches are different, the patterned insulating layer 40 of the two approaches is designed to have different shapes, and the relative position of the patterned insulating layer 40 and the auxiliary electrode 34 is different. For example, the auxiliary electrode 34 of the foregoing embodiment is disposed at a planar first substrate 30. Therefore, the electric field generated in the liquid crystal alignment process only drives the liquid crystal molecules LC to pretilt outwardly, without driving the liquid crystal molecules LC to pretilt toward the desired first direction D1 the second direction D2, the third direction D3 and the fourth direction D4. In this case, the auxiliary electrode 34 of the foregoing embodiments is disposed below the patterned insulating layer 40 and overlaps the patterned insulating layer 40, and partially overlaps the inner insulating branches 42 such that the liquid crystal molecules LC may pretilt toward the desired direction. On the other hand, the auxiliary electrode 34 of the sixth embodiment covers the insulating frame 49, thus the auxiliary electrode 34 would have the ups and downs structure. Accordingly, the electric field generated in the liquid crystal alignment process may drive the liquid crystal molecules LC to pretilt outwardly and may drive the liquid crystal molecules LC to pretilt toward the desired first direction D1 the second direction D2, the third direction D3 and the fourth direction D4 simultaneously. According to the first to the fifth embodiments, if the auxiliary electrode 34 is disposed under the patterned insulating layer 40, the inner insulating branches 42 and the slits 42S overlap the auxiliary electrode 34. While the auxiliary electrode 34 is disposed above the patterned insulating layer 40, the auxiliary electrode 34 may overlap the insulating frame 49. In other words, the principles of the two approaches are different, and thus the designed shapes are slightly different.

Please refer to FIG. 27 and FIG. 28, in the present embodiment, the first insulating frame 491, the second insulating frame 492, the third insulating frame 493 and the fourth insulating frame 494 are not connected to each other, and are respectively overlap the auxiliary electrode 34 in the vertical projection direction Z. In addition, the inner insulating branches 42 and the outer insulating branches 48 are respectively overlap the auxiliary electrode 34, but not limited thereto. Further, in the vertical projection direction Z, the pixel electrode 32 partially overlaps the inner insulating branches 42, but may not overlap the outer insulating branches 48 and the insulating frame 49.

Figure 29:
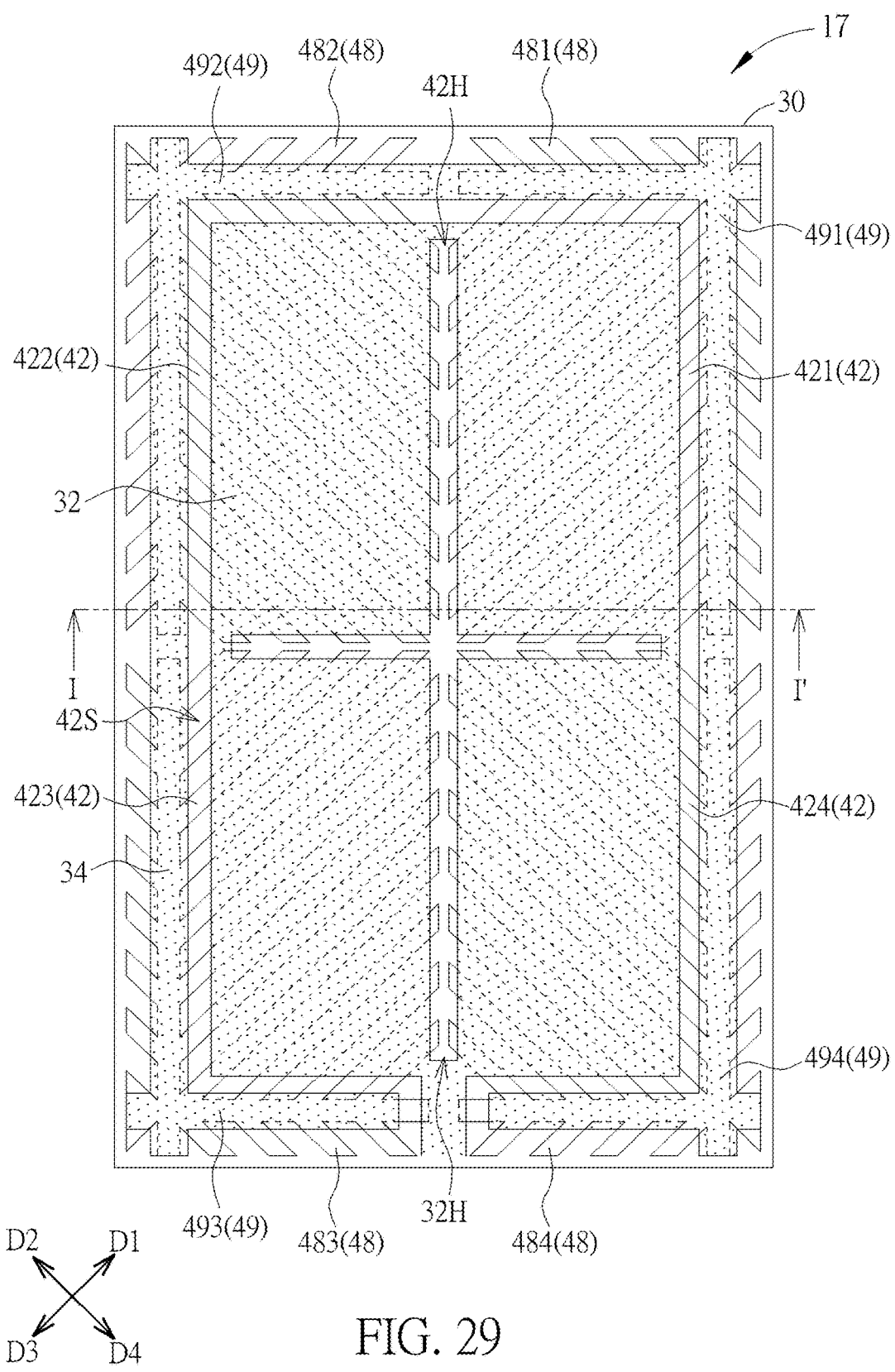
FIG. 29 is a top view of a liquid crystal display panel according to a seventh embodiment of the present disclosure.
Figure 30:
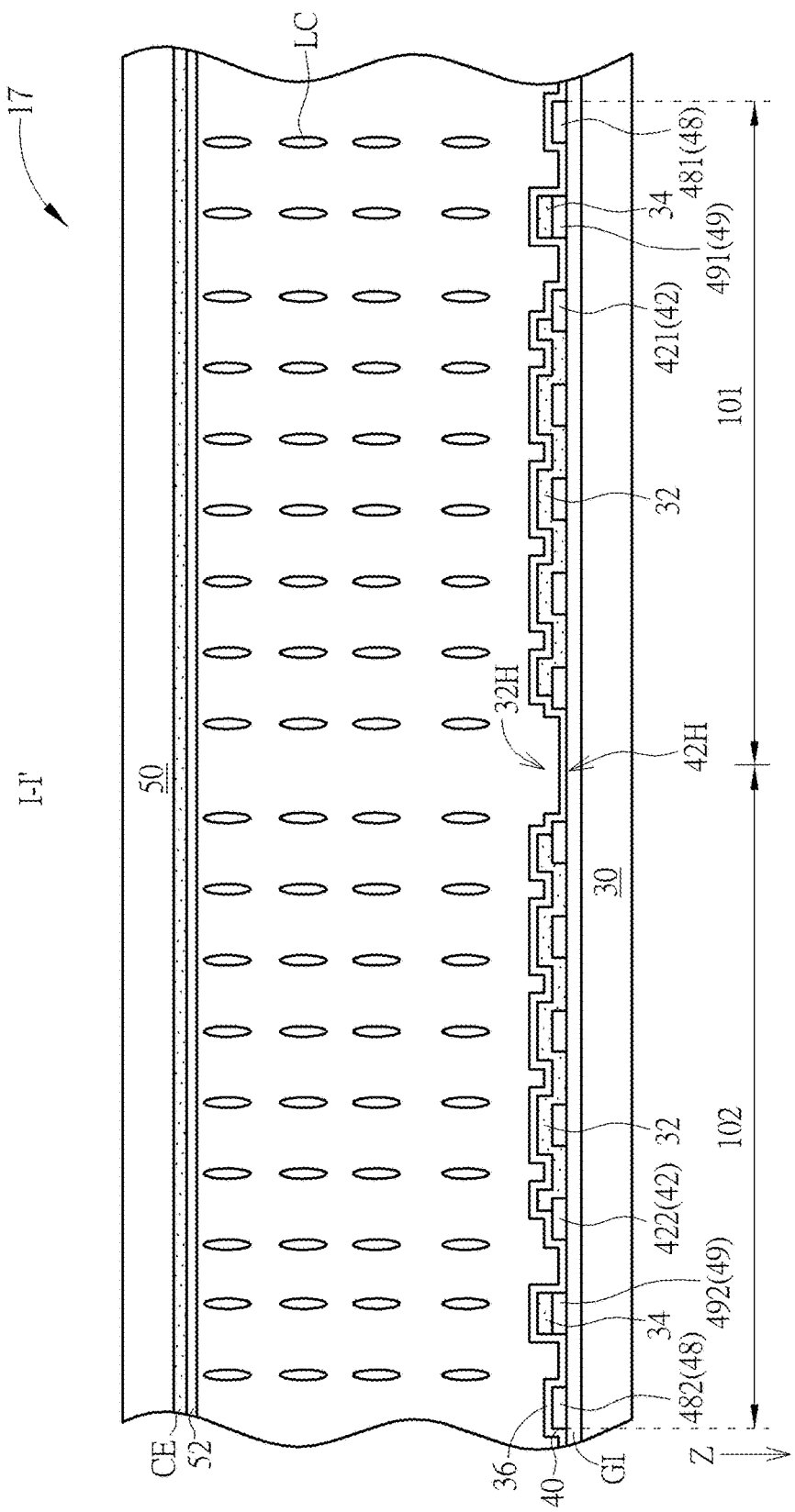
FIG. 30 is a cross-sectional view taken along line I-I' of the liquid crystal display panel in FIG. 29.

Referring to FIG. 29 and FIG. 30, FIG. 29 is a top view of a liquid crystal display panel according to a seventh embodiment of the present disclosure, and FIG. 30 is a cross-sectional view taken along line I-I' of the liquid crystal display panel in FIG. 29. As shown in FIG. 29 and FIG. 30, different from the sixth embodiment, in the liquid crystal display panel 17 of the present embodiment, the inner insulating branches 42 of the patterned insulating layer 40 may extend further toward the center of the pixel, but the inner insulating branches 42 are not connected to each other such that an opening 42H is formed. In the present embodiment, the opening 42H may be a cross-shaped opening, which may be substantially corresponding to the cross-shaped opening 32H of the pixel electrode 32, but not limited thereto. The opening 42H may be any shape.

Figure 31:
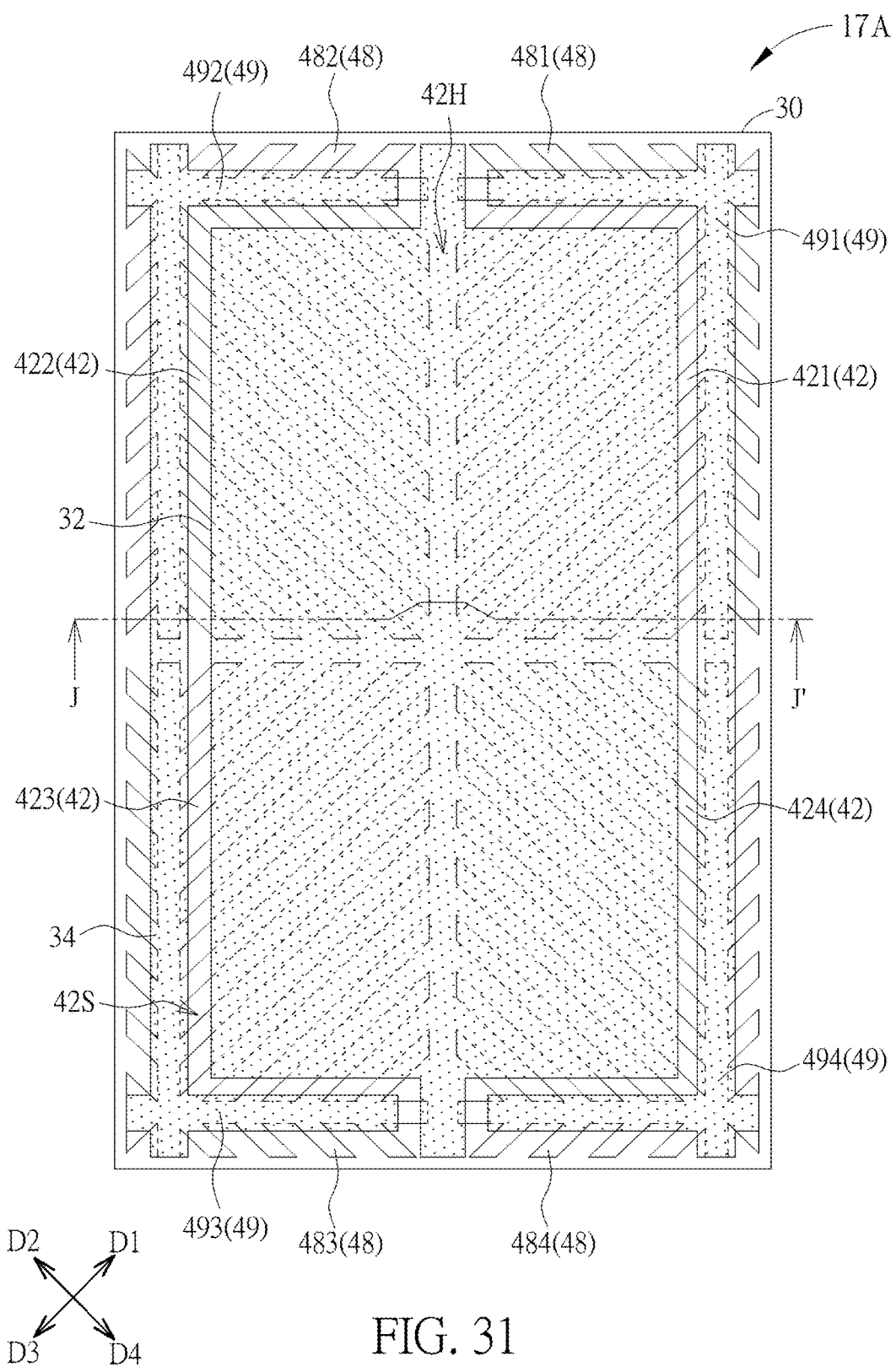
FIG. 31 is a top view of a liquid crystal display panel according to a variant embodiment of the seventh embodiment of the present disclosure.
Figure 32:
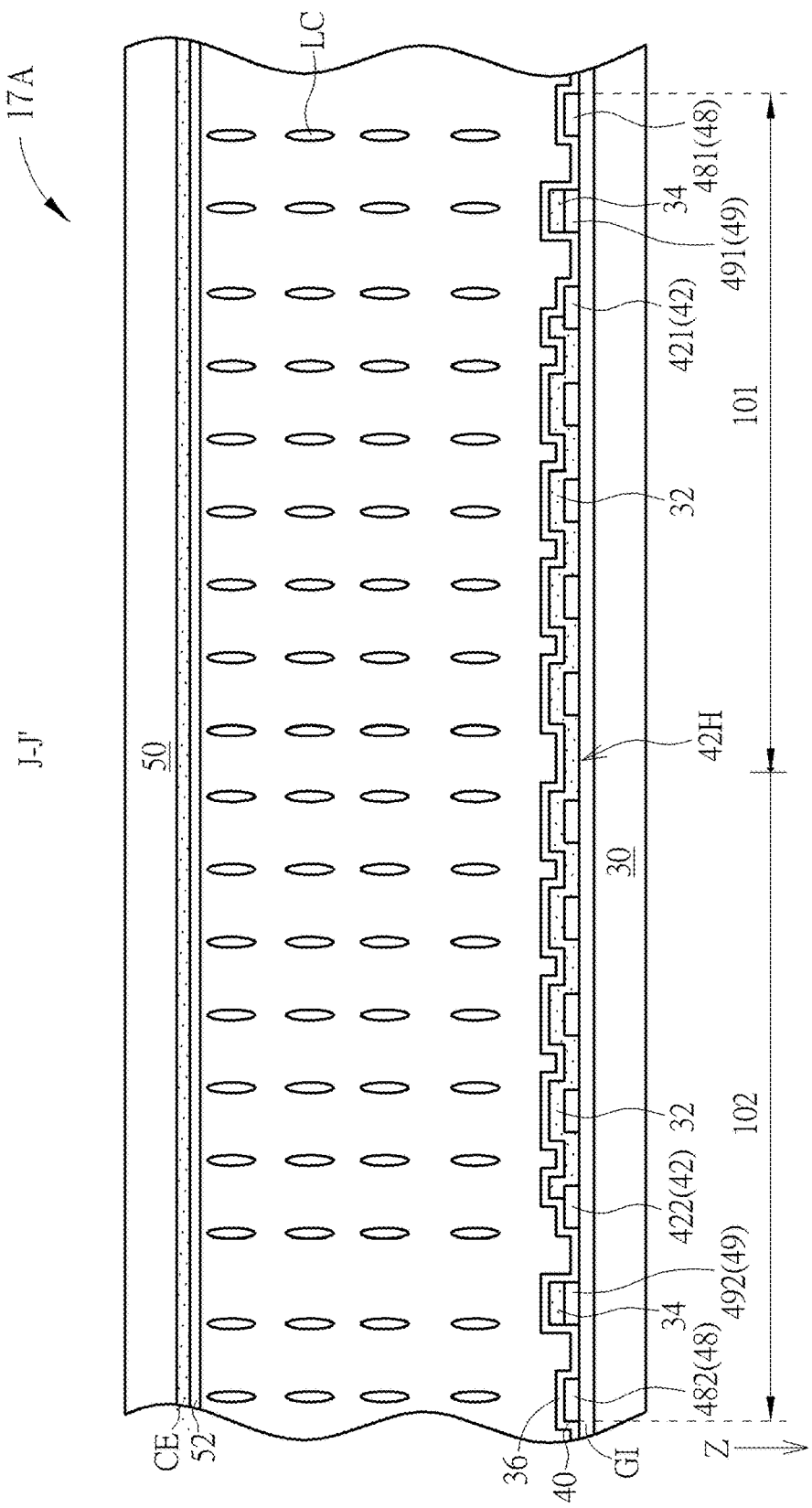
FIG. 32 is a cross-sectional view taken along line J-J' of the liquid crystal display panel in FIG. 31.

Referring to FIG. 31 and FIG. 32, FIG. 31 is a top view of a liquid crystal display panel according to a variant embodiment of the seventh embodiment of the present disclosure and FIG. 32 is a cross-sectional view taken along line J-J' of the liquid crystal display panel in FIG. 31. As shown in FIG. 31 and FIG. 32, different from the seventh embodiment, in the liquid crystal display panel 17A of the present embodiment, the pixel electrode 32 is a full-surfaced electrode, without any openings or slits.

Figure 33:
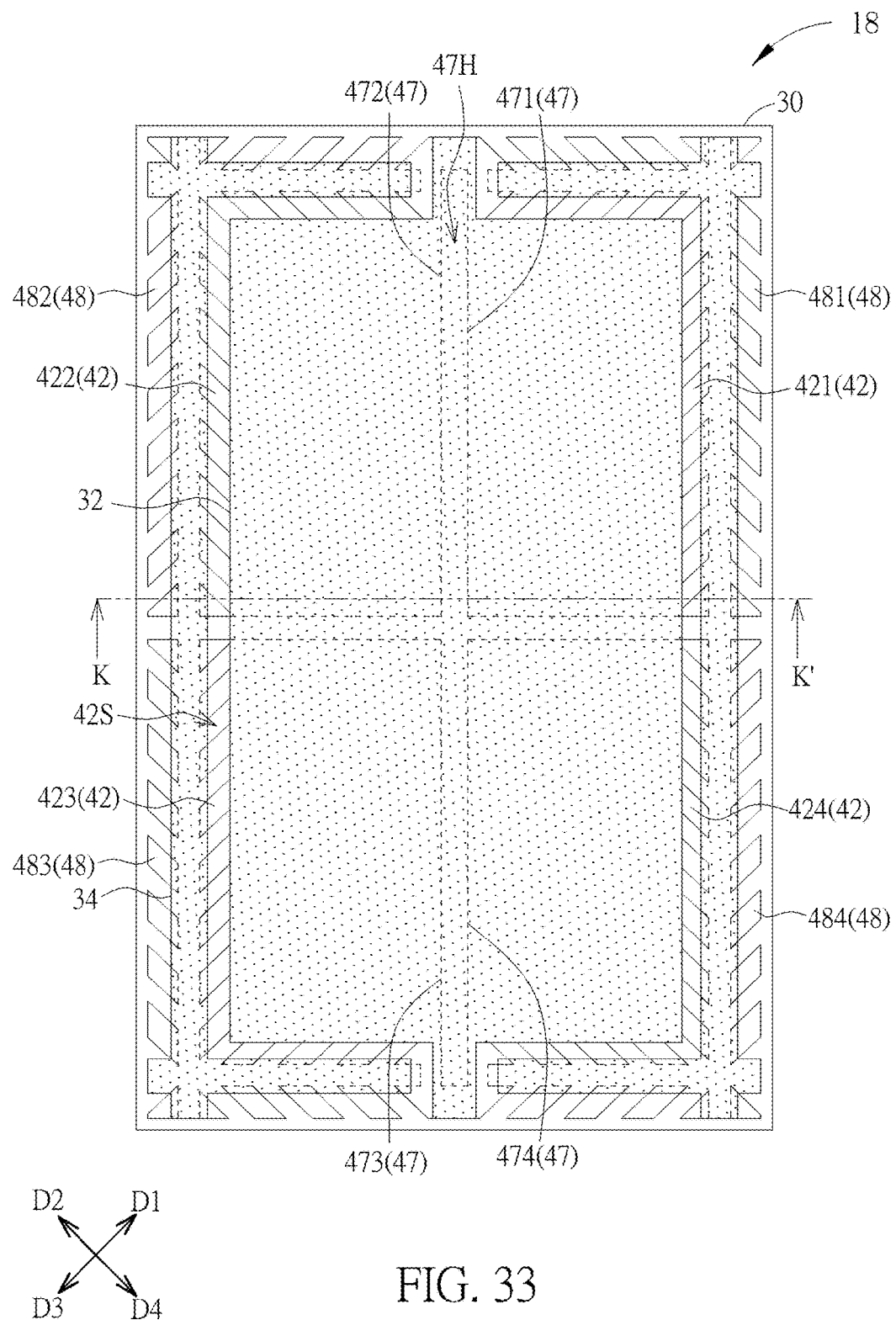
FIG. 33 is a top view of a liquid crystal display panel according to an eighth embodiment of the present disclosure.
Figure 34:
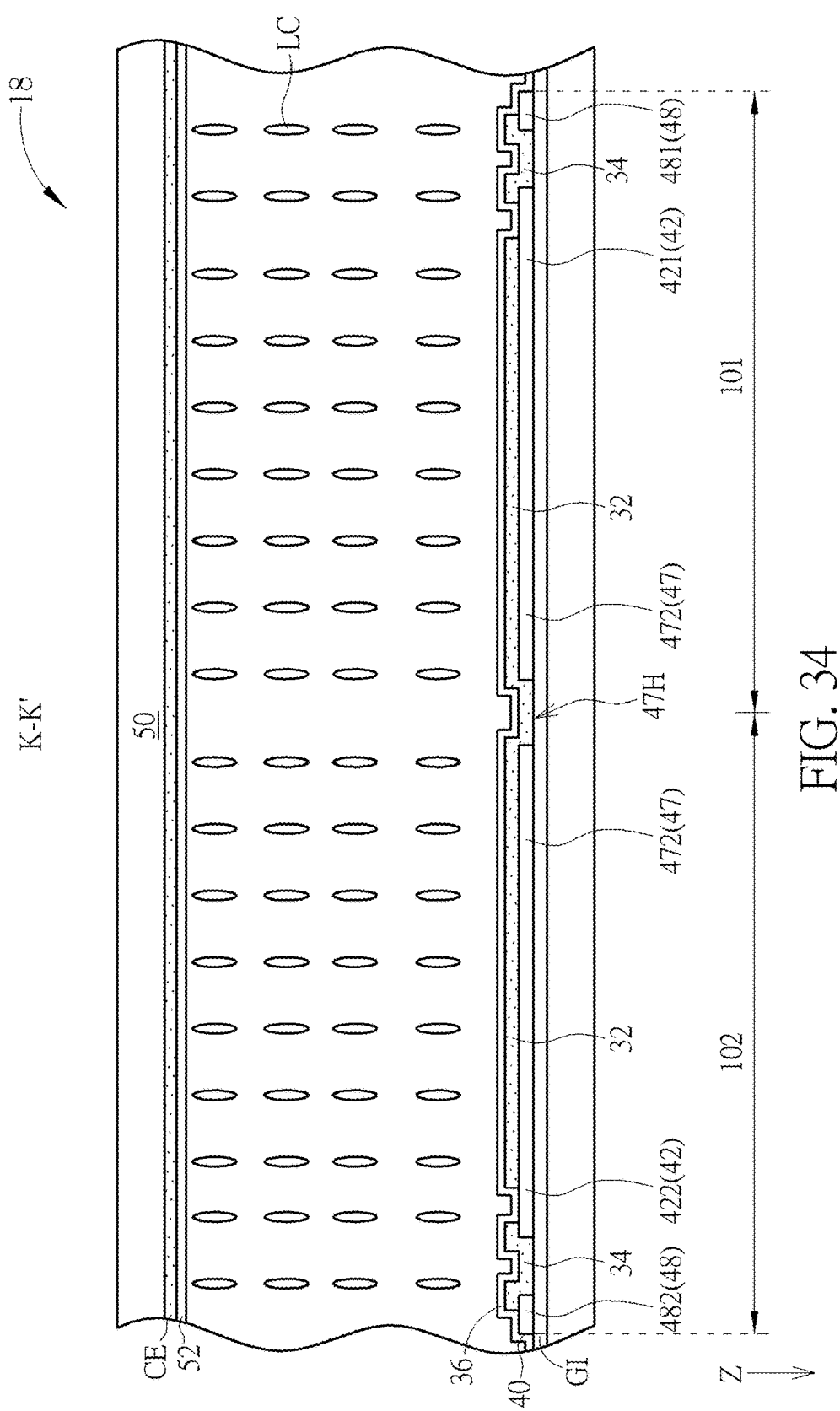
FIG. 34 is a cross-sectional view taken along line K-K' of the liquid crystal display panel in FIG. 33.

Referring to FIG. 33 and FIG. 34, FIG. 33 is a top view of a liquid crystal display panel according to an eighth embodiment of the present disclosure, and FIG. 34 is a cross-sectional view taken along line K-K' of the liquid crystal display panel in FIG. 33. As shown in FIG. 33 and FIG. 34, different from the foregoing embodiment, in the liquid crystal display panel 18 of the present embodiment, the patterned insulating layer 40 includes a plurality of inner insulating branches 42 and a plurality of outer insulating branches 48, but does not include the insulating frames. In other words, the inner insulating branches 42 and the outer insulating branches 48 are separated from each other. The auxiliary electrode 34 is disposed between the inner insulating branches 42 and the outer insulating branches 48, and partially overlaps the inner insulating branches 42 and the outer insulating branches 48 respectively. Moreover, the patterned insulating layer 40 further includes a plurality of insulating blocks 47, wherein each of the insulating blocks 47 may be a polygonal pattern, such as rectangular, but not limited thereto. The insulating blocks 47 includes a first insulating block 471, a second insulating block 472, a third insulating block 473 and a fourth insulating block 474. The first insulating block 471 is on the inner side of the first inner insulating branches 421, wherein one end of each of the first inner insulating branches 421 is connected to the first insulating block 471. The second insulating block 472 is on the inner side of the second inner insulating branches 422, wherein one end of each of the second inner insulating branches 422 is connected to the second insulating block 472. The third insulating block 473 is on the inner side of the third inner insulating branches 423, wherein one end of each of the third inner insulating branches 423 is connected to the third insulating block 473. The fourth insulating block 474 is on the inner side of the fourth inner insulating branches 424, wherein one end of each of the fourth inner insulating branches 424 is connected to the fourth insulating block 474. In addition, an opening 47H is formed between the first insulating block 471, the second insulating block 472, the third insulating block 473 and the fourth insulating block 474. In this embodiment, the opening 47H is cross-shaped, but not limited thereto. Furthermore, the pixel electrode 32 of the present embodiment is a full-surfaced electrode, without any openings or slits, but not limited thereto.

The liquid crystal display panel of the present disclosure is not limited in the above embodiments, and the liquid crystal display panel described in the above embodiments can be chosen, combined and utilized as required.

In conclusion, the liquid crystal display panel of the present disclosure uses the design, which the pixel electrode has the cruciform opening structure, to change the electric power line related with the cruciform opening and decrease the boundary area of the alignment region situated at the two opposite ends of the cruciform opening. Using the auxiliary electrode located adjacent to the periphery of the pixel electrode and the patterned insulating layer change the electric power line related with the periphery of the pixel electrode. The liquid crystal molecules LC located at the periphery of the auxiliary electrode can continuously lie down outwards, so the problem of the dark lines can be improved and the transmittance can be increasing.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display panel, comprising:
   a first substrate;
   a data line and a gate line disposed on the first substrate;
   an active switching device disposed on the first substrate and electrically connected to the data line and the gate line;
   a patterned insulating layer disposed on the first substrate, wherein the patterned insulating layer comprises a plurality of inner insulating branches and a plurality of slits, and each of the slits is located between two adjacent inner insulating branches;
   a pixel electrode disposed on the patterned insulating layer and electrically connected to the active switching device, wherein a periphery of the pixel electrode overlaps the inner insulating branches;
   an auxiliary electrode disposed on the first substrate and at least partially surrounding the pixel electrode, wherein the auxiliary electrode and the pixel electrode are not electrically connected, and the auxiliary electrode partially overlaps the inner insulating branches in a vertical projection direction;
   a second substrate disposed to face the first substrate;
   a common electrode disposed on the second substrate; and
   liquid crystal molecules interposed between the first substrate and the second substrate.

2. The liquid crystal display panel according to claim 1, further comprising a plurality of alignment regions, wherein the alignment regions comprises a first alignment region, a second alignment region, a third region and a fourth alignment region, the inner insulating branches comprise:
   a plurality of first inner insulating branches located in the first alignment region and extending along a first direction;
   a plurality of second inner insulating branches located in the second alignment region and extending along a second direction;
   a plurality of third inner insulating branches located in the third alignment region and extending along a third direction; and
   a plurality of fourth inner insulating branches located in the fourth alignment region and extending along a fourth direction;
   wherein the first direction, the second direction, the third direction and the fourth direction, are respectively different directions extending outwardly from a center point of the alignment regions, and the pixel electrode is disposed in the first, the second, the third and the fourth alignment regions.

3. The liquid crystal display panel according to claim 2, wherein the auxiliary electrode is disposed under the patterned insulating layer, and the pixel electrode is disposed on the patterned insulating layer.

4. The liquid crystal display panel according to claim 3, wherein the auxiliary electrode partially overlaps the pixel electrode in the vertical projection direction.

5. The liquid crystal display panel according to claim 4, wherein the inner insulating branches protrude from an outer side of the auxiliary electrode.

6. The liquid crystal display panel according to claim 5, wherein the inner insulating branches are located within a corresponding outer side of each of the alignment regions, and the pixel electrode has a cross-shaped opening.

7. The liquid crystal display panel according to claim 5, wherein the inner insulating branches extend from a corresponding outer side of each of the alignment regions to an inner side of each of the alignment regions, and the pixel electrode has a cross-shaped opening.

8. The liquid crystal display panel according to claim 7, wherein the inner insulating branches are not connected at a corresponding junction of the alignment regions, and the junction of the alignment regions comprises an opening.

9. The liquid crystal display panel according to claim 3, wherein the inner insulating branches are not protrude from an outer side of the auxiliary electrode.

10. The liquid crystal display panel according to claim 9, wherein the inner insulating branches extend from a corresponding outer side of each of the alignment regions to an inner side of each of the alignment regions, the inner insulating branches are not connected at a corresponding junction of the alignment regions, the junction of the alignment regions comprises an opening, and the pixel electrode has a cross-shaped opening.

11. The liquid crystal display panel according to claim 9, wherein the patterned insulating layer further comprises an insulating frame, the insulated frame comprises a multi-frame-shaped pattern, the insulating frame surrounds the inner insulating branches, an end of each of the inner insulating branches is connected to an inner side of the insulating frame, and the insulating frame partially overlaps the auxiliary electrode in the vertical projection direction.

12. The liquid crystal display panel according to claim 3, wherein the auxiliary electrode does not overlap the pixel electrode in the vertical projection direction.

13. The liquid crystal display panel according to claim 12, wherein the patterned insulating layer further comprises an insulating frame and an insulating main body, the insulating frame has a multi-frame-shaped pattern, the insulating frame surrounds the inner insulating branches, an end of each of the inner insulating branches is connected to an inner side of the insulating frame, and the insulating frame partially overlaps the auxiliary electrode in the vertical projection direction, and another end of each of the inner insulating branches is connected to the insulating main body.

14. The liquid crystal display panel according to claim 3, wherein an end of each of the inner insulating branches is connected to an end of another one of the inner insulating branches.

15. The liquid crystal display panel according to claim 2, wherein the pixel electrode and the auxiliary electrode are disposed on the patterned insulating layer.

16. The liquid crystal display panel according to claim 15, wherein the auxiliary electrode and the pixel electrode are a same patterned conductive layer.

17. The liquid crystal display panel according to claim 15, wherein the patterned insulating layer further comprises a plurality of outer insulating branches, and the outer insulating branches comprise:
  a plurality of first outer insulating branches located adjacent to an outer side of the first inner insulating branches, wherein a first portion of the first outer insulating branches extends in the second direction, and a second portion of the first outer insulating branches extends in the fourth direction;
  a plurality of second outer insulating branches located adjacent to an outer side of the second inner insulating branches, wherein a first portion of the second outer insulating branches extends in the first direction, and a second portion of the second outer insulating branches extends in the third direction;
  a plurality of third outer insulating branches located adjacent to an outer side of the third inner insulating branches, wherein a first portion of the third outer insulating branches extends in the second direction, and a second portion of the third outer insulating branches extends in the fourth direction; and
  a plurality of fourth outer insulating branches located adjacent to an outer side of the fourth inner insulating branches, wherein a first portion of the fourth outer insulating branches extends in the first direction, and a second portion of the fourth outer insulating branches extends in the third direction.

18. The liquid crystal display panel according to claim 17, wherein the patterned insulating layer further comprises a plurality of insulating frames, each of the insulating frames is an L-shaped pattern, and the insulating frames comprise:
  a first insulating frame disposed between the first inner insulating branches and the first outer insulating branches, wherein an end of each of the first insulating branches is connected to an inner side of the first insulating frame, and an end of each of the first outer insulating branches is connected to an outer side of the first insulating frame;
  a second insulating frame disposed between the second inner insulating branches and the second outer insulating branches, wherein an end of each of the second insulating branches is connected to an inner side of the second insulating frame, and an end of each of the second outer insulating branches is connected to an outer side of the second insulating frame;
  a third insulating frame disposed between the third inner insulating branches and the third outer insulating branches, wherein an end of each of the third insulating branches is connected to an inner side of the third insulating frame, and an end of each of the third outer insulating branches is connected to an outer side of the third insulating frame; and
  a fourth insulating frame disposed between the fourth inner insulating branches and the fourth outer insulating branches, wherein an end of each of the fourth insulating branches is connected to an inner side of the fourth insulating frame, and an end of each of the fourth outer insulating branches is connected to an outer side of the fourth insulating frame;
  wherein the first insulating frame, the second insulating frame, the third insulating frame and the fourth insulating frame are not connected to each other and respectively partially overlap the auxiliary electrode portion in the vertical projection direction.

19. The liquid crystal display panel according to claim 18, wherein the pixel electrode at least partially overlaps the inner insulating branches in the vertical projection direction.

20. The liquid crystal display panel according to claim 18, wherein the patterned insulating layer has a cross-shaped opening located between the inner insulating branches.

21. The liquid crystal display panel according to claim 17, wherein the patterned insulating layer further comprises a plurality of insulating blocks, each of the insulating block is a polygonal pattern, and such insulating block include:
a first insulating block disposed on the inner side of the first inner insulating branches, wherein one end of each of the first inner insulating branches is connected to the first insulating block;
a second insulating block disposed on the inner side of the second inner insulating branches, wherein one end of each of the second inner insulating branches is connected to the second insulating block;
a third insulating block disposed on the inner side of the third inner insulating branches, wherein one end of each of the third inner insulating branches is connected to the third insulating block; and
a fourth insulating block disposed on the inner side of the fourth inner insulating branches, wherein one end of each of the fourth inner insulating branches is connected to the fourth insulating block;
wherein an opening is formed between the first insulating block, the second insulating block, the third insulating block, and the fourth insulating block.

22. The liquid crystal display panel according to claim 1, wherein the pixel electrode is a full-surfaced electrode.

23. The liquid crystal display panel according to claim 1, wherein the pixel electrode has a cross-shaped opening.

24. The liquid crystal display panel according to claim 1, wherein each of the slits has a depth, and the depth is greater than or equal to 0.2 micrometers and less than or equal to 1 micrometers.

25. A liquid crystal alignment method, comprising:
providing the liquid crystal display panel according to claim 1;
mixing the liquid crystal molecules with a plurality of light-curing alignment monomers;
applying a first voltage to the common electrode and applying a second voltage to the pixel electrode, and applying a third voltage to the auxiliary electrode, so that a pretilt angle of the liquid crystal molecules is formed; and
light irradiating the light-curing alignment monomers under the first voltage, the second voltage and the third voltage, such that the light-curing alignment monomers are polymerized to form on a first alignment film and a second alignment film on the first substrate and the second substrate respectively, and fix the pre-tilt angle of the liquid crystal molecules;
wherein the difference of the root mean square of the third voltage and the root mean square of the first voltage is greater than the difference of the root mean square of the second voltage and the root mean square of the first voltage.

* * * * *